US005472056A

United States Patent [19]

Orbach

[11] Patent Number: 5,472,056

[45] Date of Patent: Dec. 5, 1995

[54] CONTROL SYSTEM FOR AGRICULTURAL VEHICLE AND CALIBRATION METHOD FOR SUCH CONTROL SYSTEMS

[75] Inventor: Abraham Orbach, Naperville, Ill.

[73] Assignee: Case Corporation, Racine, Wis.

[21] Appl. No.: 264,794

[22] Filed: Jun. 23, 1994

Related U.S. Application Data

[63] Continuation-in-part of Ser. No. 118,450, Sep. 8, 1993, Pat. No. 5,421,416.

[51] Int. Cl.[6] .......... A01B 63/112

[52] U.S. Cl. .......... 172/2; 172/4; 172/7; 364/424.07

[58] Field of Search .......... 37/347, 348; 172/2, 172/3, 4, 4.5, 7, 9; 364/424.07, 431.1, 571.01, 571.03, 571.05

[56] References Cited

U.S. PATENT DOCUMENTS

| | | | |
|---|---|---|---|
| 3,825,072 | 7/1974 | Collins | 172/7 |
| 4,518,044 | 5/1985 | Wiegardt et al. . | |
| 4,677,542 | 6/1987 | Kasten | 172/9 X |
| 4,760,330 | 7/1988 | Lias, Jr. | 324/73 R |
| 4,763,124 | 8/1988 | Kovacs et al. | 324/73 R |
| 4,924,398 | 5/1990 | Fujiwara | 364/431.11 |
| 4,931,967 | 6/1990 | Boe et al. | 172/3 X |
| 4,979,092 | 12/1990 | Bergene et al. . | |
| 5,012,415 | 4/1991 | Boe et al. | 172/7 X |
| 5,291,407 | 3/1994 | Young et al. | 172/7 X |
| 5,421,416 | 6/1995 | Orbach et al. | 172/4 |

*Primary Examiner*—Terry Lee Melius
*Assistant Examiner*—Robert Pezzuto
*Attorney, Agent, or Firm*—Foley & Lardner

[57] ABSTRACT

A hitch assembly control system is provided in which signals representative of battery voltage are used to generate a correction factor that is applied to control signals to a hitch actuator circuit to improve consistency in control. In an alternative embodiment, a correction factor is generated from signals representative of electrical parameters of solenoid coils included in the actuator circuit and this correction factor is applied to control signals to the actuator circuit. Also provided is a calibration method for a vehicle control system in which certain physical and electrical parameters of the vehicle and the control system are measured and stored during a calibration sequence for later use in the control of an implement coupled to an attachment member of the vehicle. A control method for a vehicle is also provided in which correction factors are generated from measurements of battery voltage or a solenoid coil parameter, and applied to control signals generated by a control circuit.

44 Claims, 24 Drawing Sheets

14
10
12
17
65
63
64
30
32
78
22
26
24
88
82
28
15
18
16
80
20

40
32
30
44
DRIVER
38
34
20
V
42
47
DRIVER
V
38
36
P
46

100
102
94
92
66
68
72
75
76
74
85
93
86
73
106
98
99
70
97
96
91
90
95

42
54
EEPROM
56
RAM
60
EEPROM
58
44
46
48
62
50
52
70
78
86
99
93
95
97
82
84
91
64
65
88

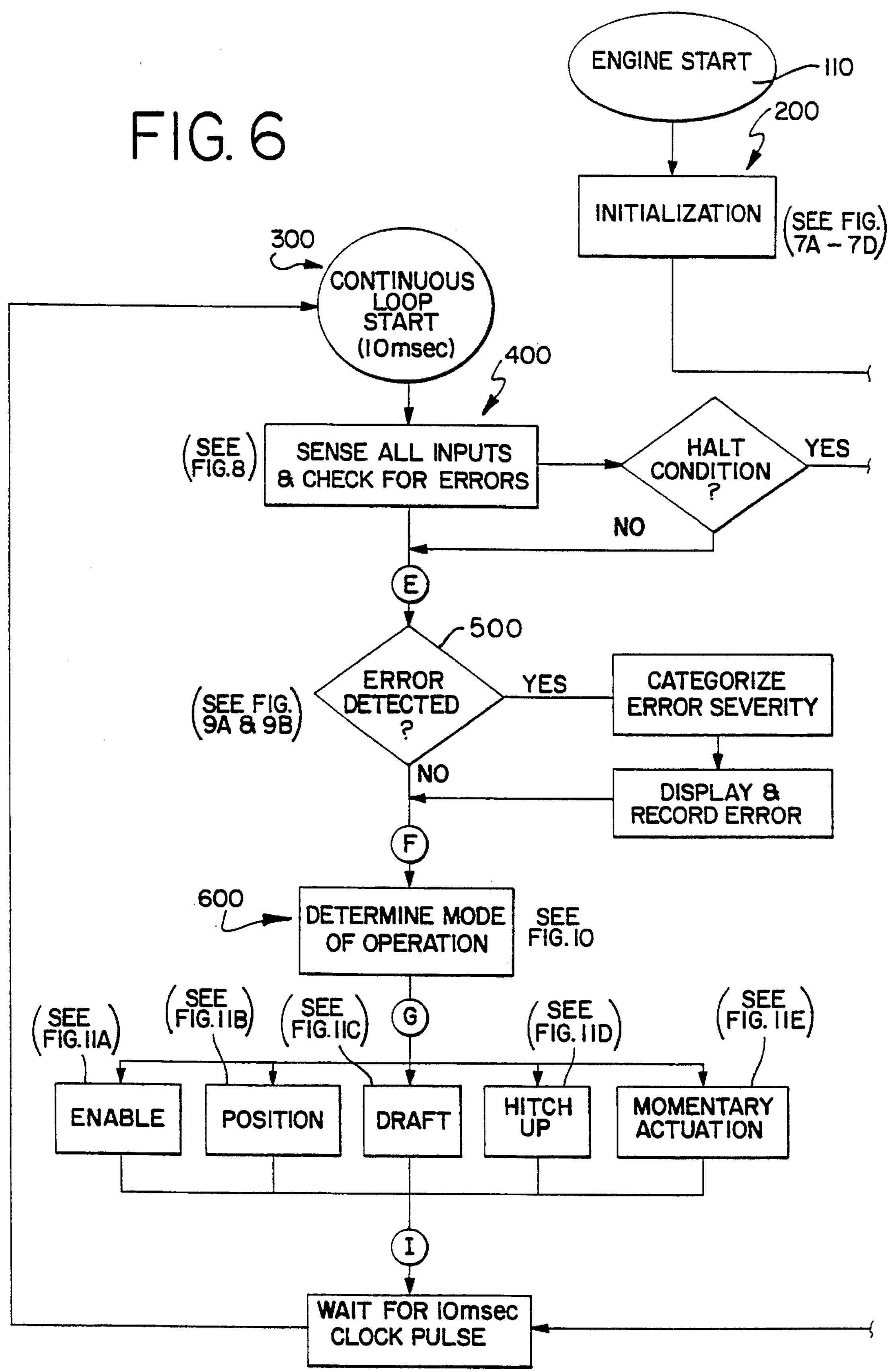
FIG. 6
ENGINE START
110
200
INITIALIZATION
(SEE FIG. 7A – 7D)
300
CONTINUOUS LOOP START (10msec)
400
(SEE FIG. 8)
SENSE ALL INPUTS & CHECK FOR ERRORS
HALT CONDITION ?
YES
NO
E
500
(SEE FIG. 9A & 9B)
ERROR DETECTED ?
YES
CATEGORIZE ERROR SEVERITY
NO
DISPLAY & RECORD ERROR
F
600
DETERMINE MODE OF OPERATION
SEE FIG. 10
(SEE FIG. 11A)
(SEE FIG. 11B)
(SEE FIG. 11C)
G
(SEE FIG. 11D)
(SEE FIG. 11E)
ENABLE
POSITION
DRAFT
HITCH UP
MOMENTARY ACTUATION
I
WAIT FOR 10msec CLOCK PULSE INITIALIZE MICROPROCESSOR
202
START THE DISPLAY BLANK
204
TURN RELAY OFF & CURRENTS TO THE COILS OFF
206
INITIALIZE VARIABLES
208
CHECK MEMORY
210
212
IS MEMORY OK?
NO
213
HALT CONDITION
YES
CHECK SOFTWARE WATCHDOG TIMER
214
IS WATCHDOG OK?
NO
216
217
LIMP CONDITION
YES
SAMPLE ANALOG INPUTS
218
CHECK RELAY CONTACTS
220
222
ARE CONTACTS OK?
NO
223
LIMP CONDITION
YES
A A
TURN RELAY ON
224
CHECK COILS
226
ARE COILS OK?
228
NO
YES
HALT CONDITION
229
DISPLAY "8"
230
SET LAMP ON FOR 2 SECONDS
232
FIND TRACTOR'S WHEEL SPEED
234
CHECK LAMP
236
IS LAMP OK?
238
NO
YES
DEGRADED 1 CONDITION
239
240
CHECK UP-DOWN-MOMENTARY SWITCH
B

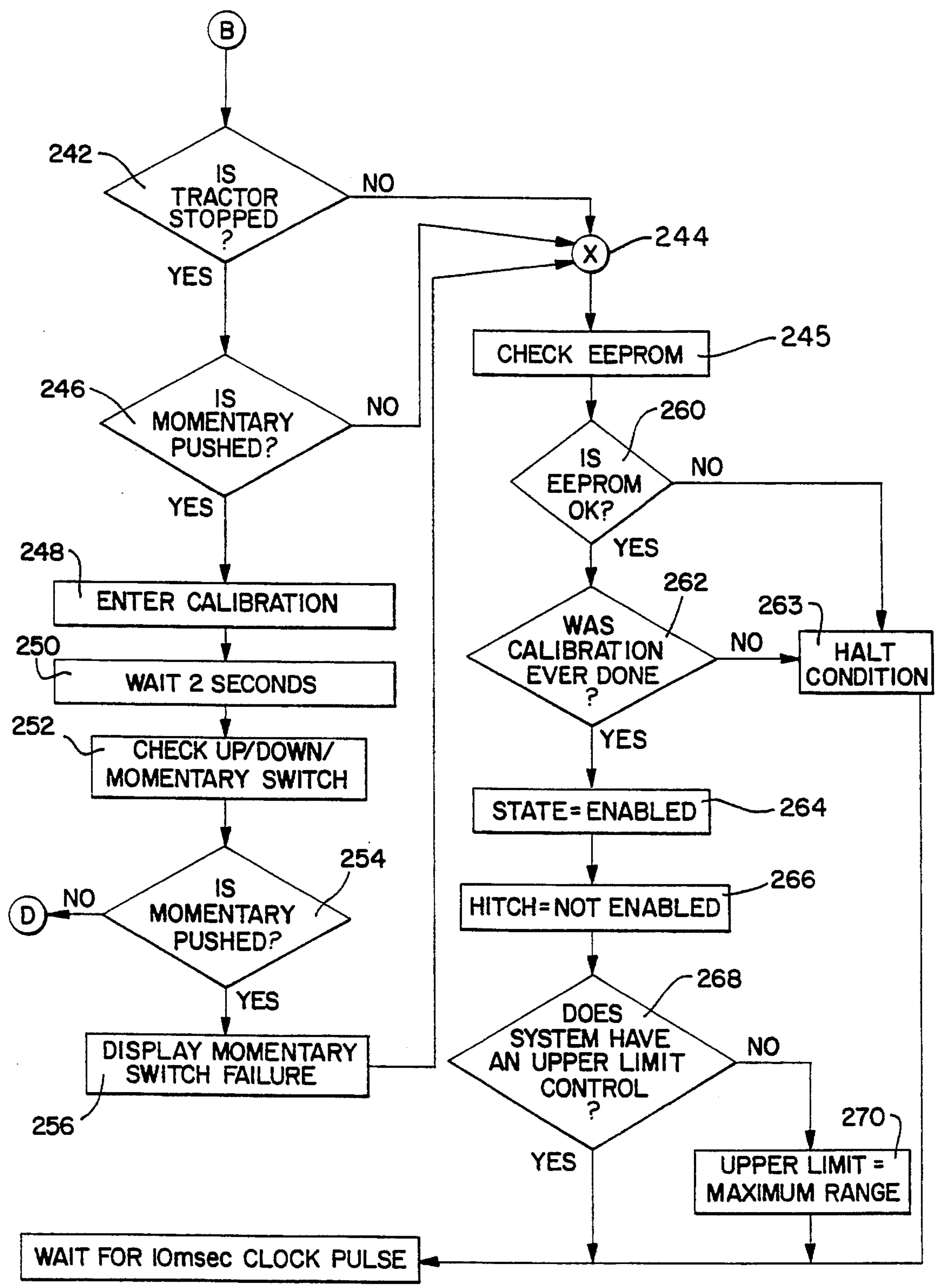
FIG. 7C
B
242
IS TRACTOR STOPPED ?
NO
YES
244
X
245
CHECK EEPROM
246
IS MOMENTARY PUSHED?
NO
YES
260
IS EEPROM OK?
NO
YES
248
ENTER CALIBRATION
262
WAS CALIBRATION EVER DONE ?
NO
YES
263
HALT CONDITION
250
WAIT 2 SECONDS
252
CHECK UP/DOWN/ MOMENTARY SWITCH
264
STATE=ENABLED
254
IS MOMENTARY PUSHED?
D
NO
YES
266
HITCH=NOT ENABLED
268
DOES SYSTEM HAVE AN UPPER LIMIT CONTROL ?
NO
YES
DISPLAY MOMENTARY SWITCH FAILURE
256
270
UPPER LIMIT = MAXIMUM RANGE
WAIT FOR 10msec CLOCK PULSE

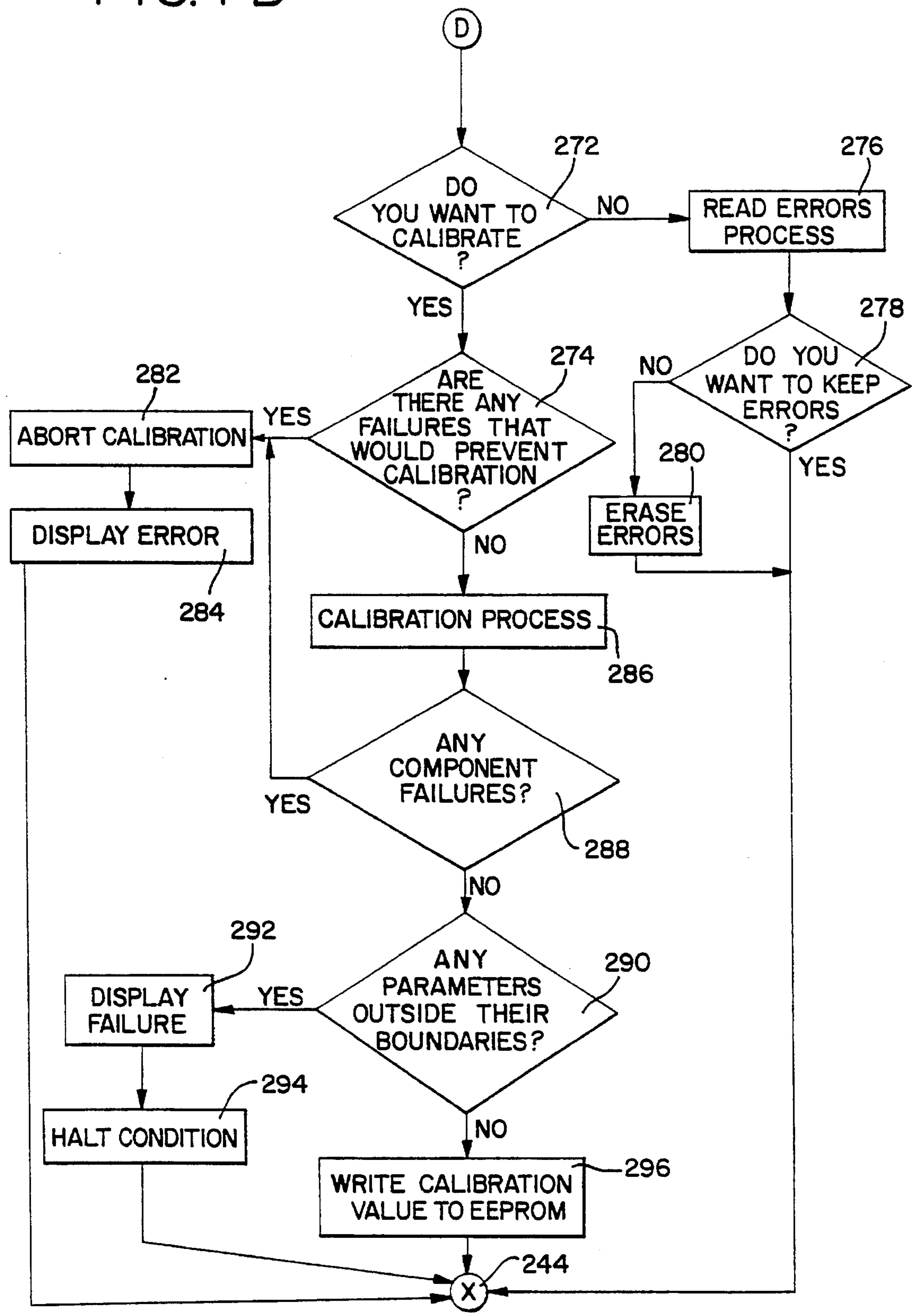
FIG. 7D
D
DO YOU WANT TO CALIBRATE ?
272
NO
READ ERRORS PROCESS
276
YES
ARE THERE ANY FAILURES THAT WOULD PREVENT CALIBRATION ?
274
DO YOU WANT TO KEEP ERRORS ?
278
NO
YES
282
ABORT CALIBRATION
YES
280
ERASE ERRORS
DISPLAY ERROR
284
NO
CALIBRATION PROCESS
286
ANY COMPONENT FAILURES?
YES
288
NO
292
ANY PARAMETERS OUTSIDE THEIR BOUNDARIES?
290
DISPLAY FAILURE
YES
294
HALT CONDITION
NO
WRITE CALIBRATION VALUE TO EEPROM
296
X
244

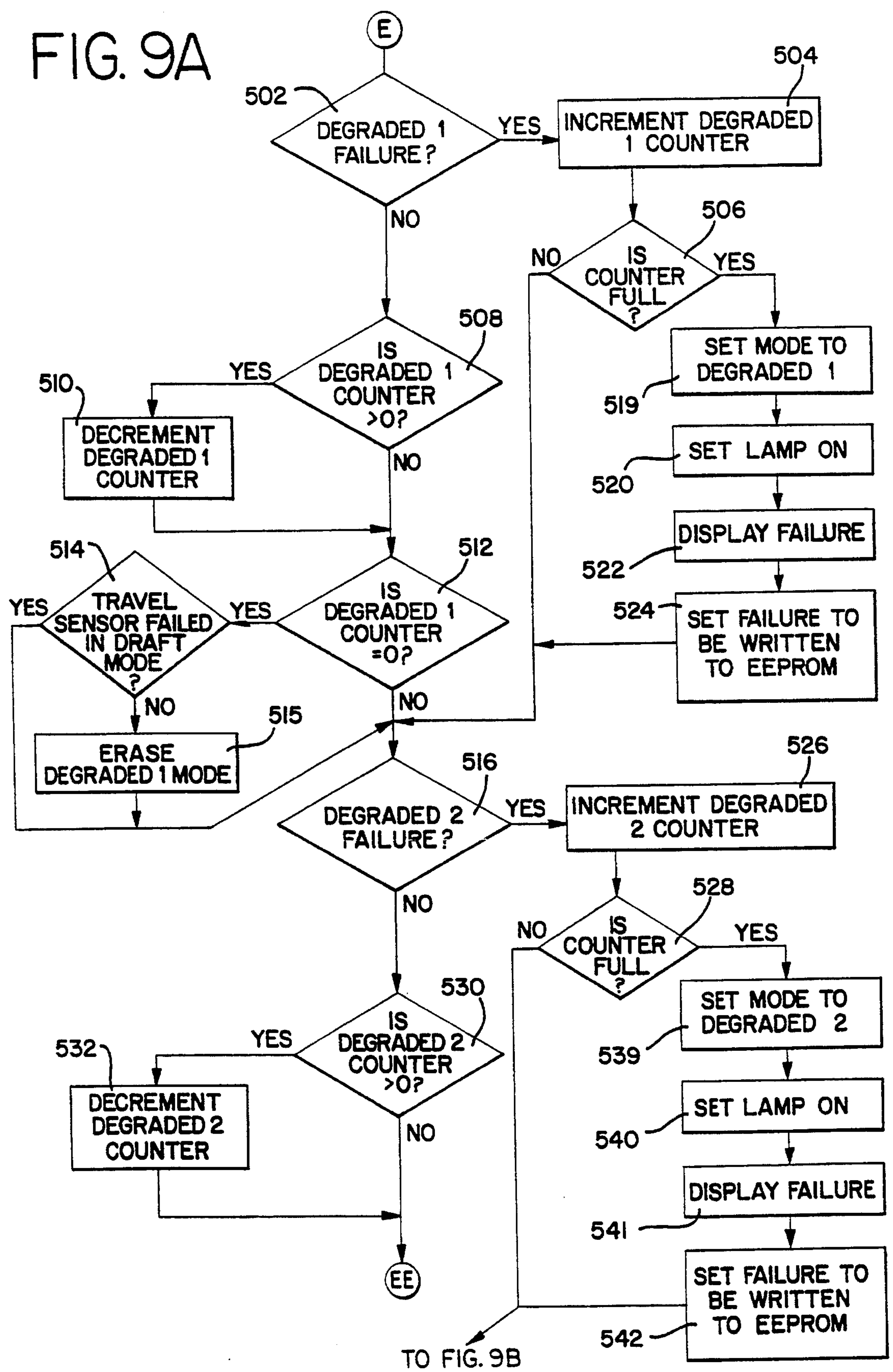
FIG. 9A
E
502
DEGRADED 1 FAILURE?
YES
NO
504
INCREMENT DEGRADED 1 COUNTER
506
IS COUNTER FULL ?
NO
YES
508
IS DEGRADED 1 COUNTER >0?
YES
NO
510
DECREMENT DEGRADED 1 COUNTER
SET MODE TO DEGRADED 1
519
SET LAMP ON
520
DISPLAY FAILURE
522
524
SET FAILURE TO BE WRITTEN TO EEPROM
514
TRAVEL SENSOR FAILED IN DRAFT MODE ?
YES
YES
NO
512
IS DEGRADED 1 COUNTER =0?
NO
515
ERASE DEGRADED 1 MODE
516
DEGRADED 2 FAILURE?
YES
NO
526
INCREMENT DEGRADED 2 COUNTER
528
IS COUNTER FULL ?
NO
YES
SET MODE TO DEGRADED 2
539
530
IS DEGRADED 2 COUNTER >0?
YES
NO
532
DECREMENT DEGRADED 2 COUNTER
SET LAMP ON
540
DISPLAY FAILURE
541
SET FAILURE TO BE WRITTEN TO EEPROM
542
EE
TO FIG. 9B

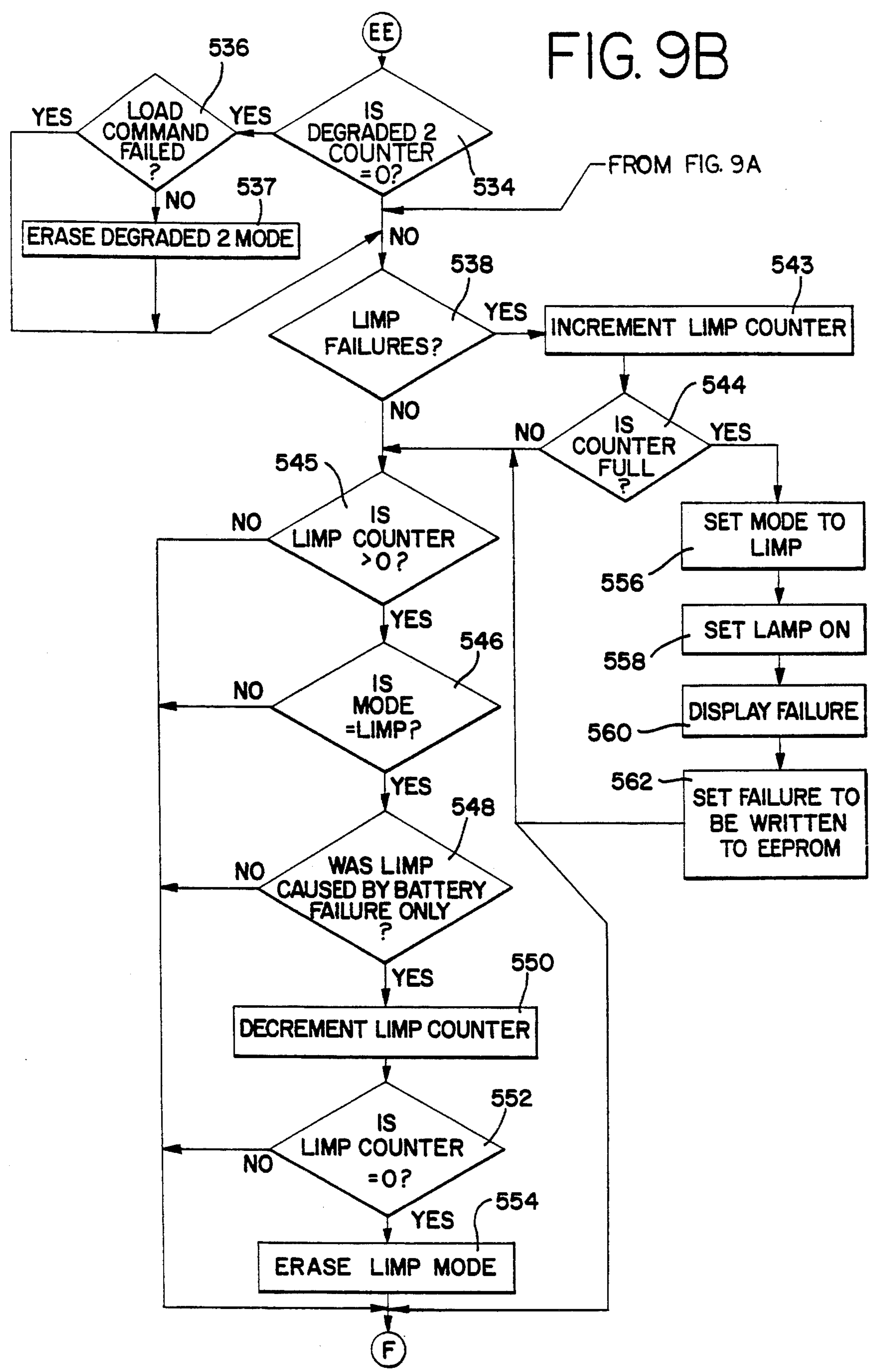

FIG. 9B
EE
536
LOAD COMMAND FAILED ?
YES
YES
IS DEGRADED 2 COUNTER =0?
534
FROM FIG. 9A
NO
537
ERASE DEGRADED 2 MODE
NO
538
LIMP FAILURES?
YES
543
INCREMENT LIMP COUNTER
NO
544
IS COUNTER FULL ?
NO
YES
545
IS LIMP COUNTER >0 ?
NO
SET MODE TO LIMP
556
SET LAMP ON
558
DISPLAY FAILURE
560
562
SET FAILURE TO BE WRITTEN TO EEPROM
YES
546
IS MODE =LIMP?
NO
YES
548
WAS LIMP CAUSED BY BATTERY FAILURE ONLY ?
NO
YES
550
DECREMENT LIMP COUNTER
552
IS LIMP COUNTER =0?
NO
YES
554
ERASE LIMP MODE
F

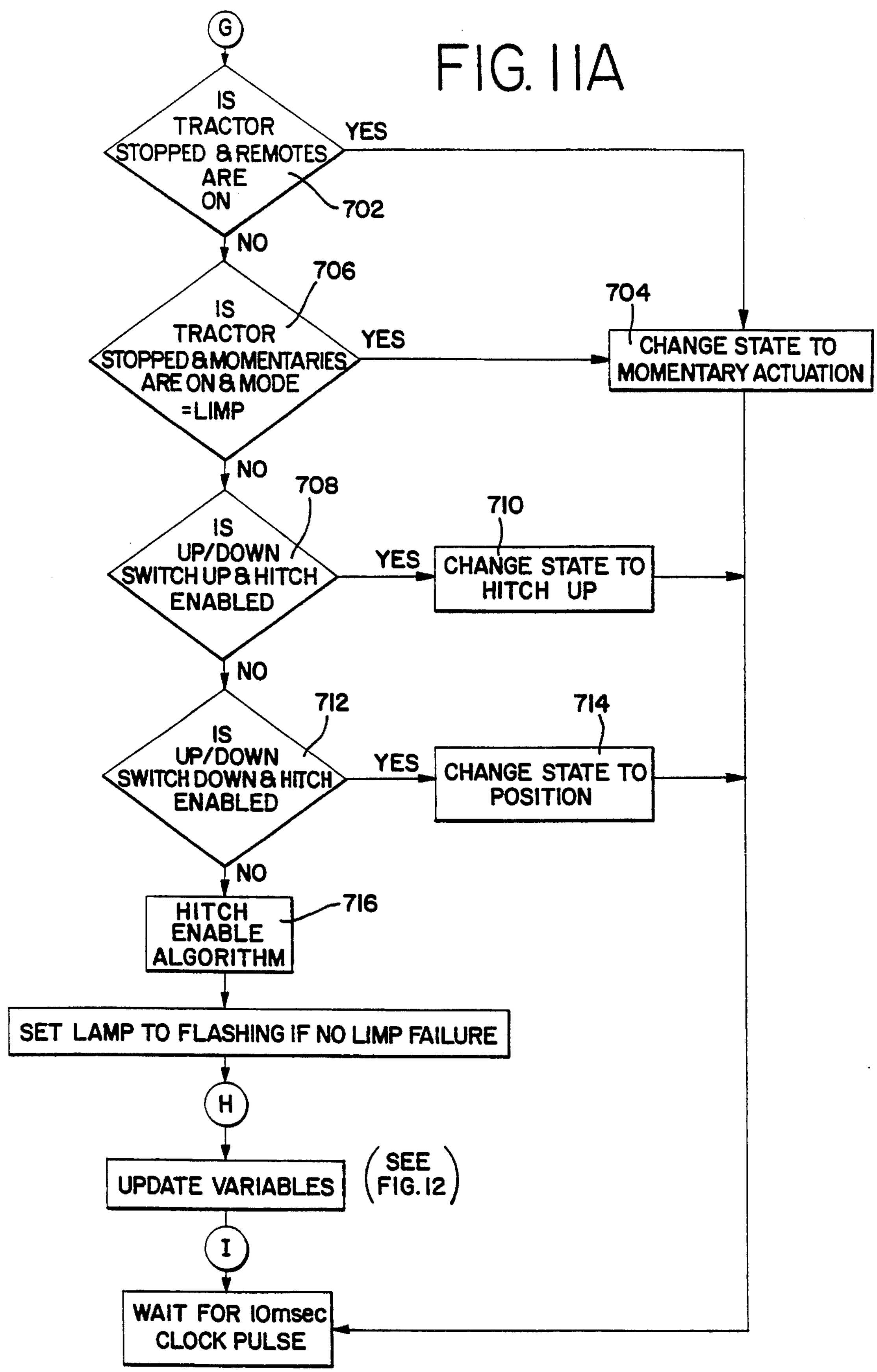
FIG. 11A
G
IS TRACTOR STOPPED & REMOTES ARE ON
702
YES
NO
706
IS TRACTOR STOPPED & MOMENTARIES ARE ON & MODE =LIMP
YES
704
CHANGE STATE TO MOMENTARY ACTUATION
NO
708
IS UP/DOWN SWITCH UP & HITCH ENABLED
YES
710
CHANGE STATE TO HITCH UP
NO
712
IS UP/DOWN SWITCH DOWN & HITCH ENABLED
YES
714
CHANGE STATE TO POSITION
NO
HITCH ENABLE ALGORITHM
716
SET LAMP TO FLASHING IF NO LIMP FAILURE
H
UPDATE VARIABLES
(SEE FIG. 12)
I
WAIT FOR 10msec CLOCK PULSE

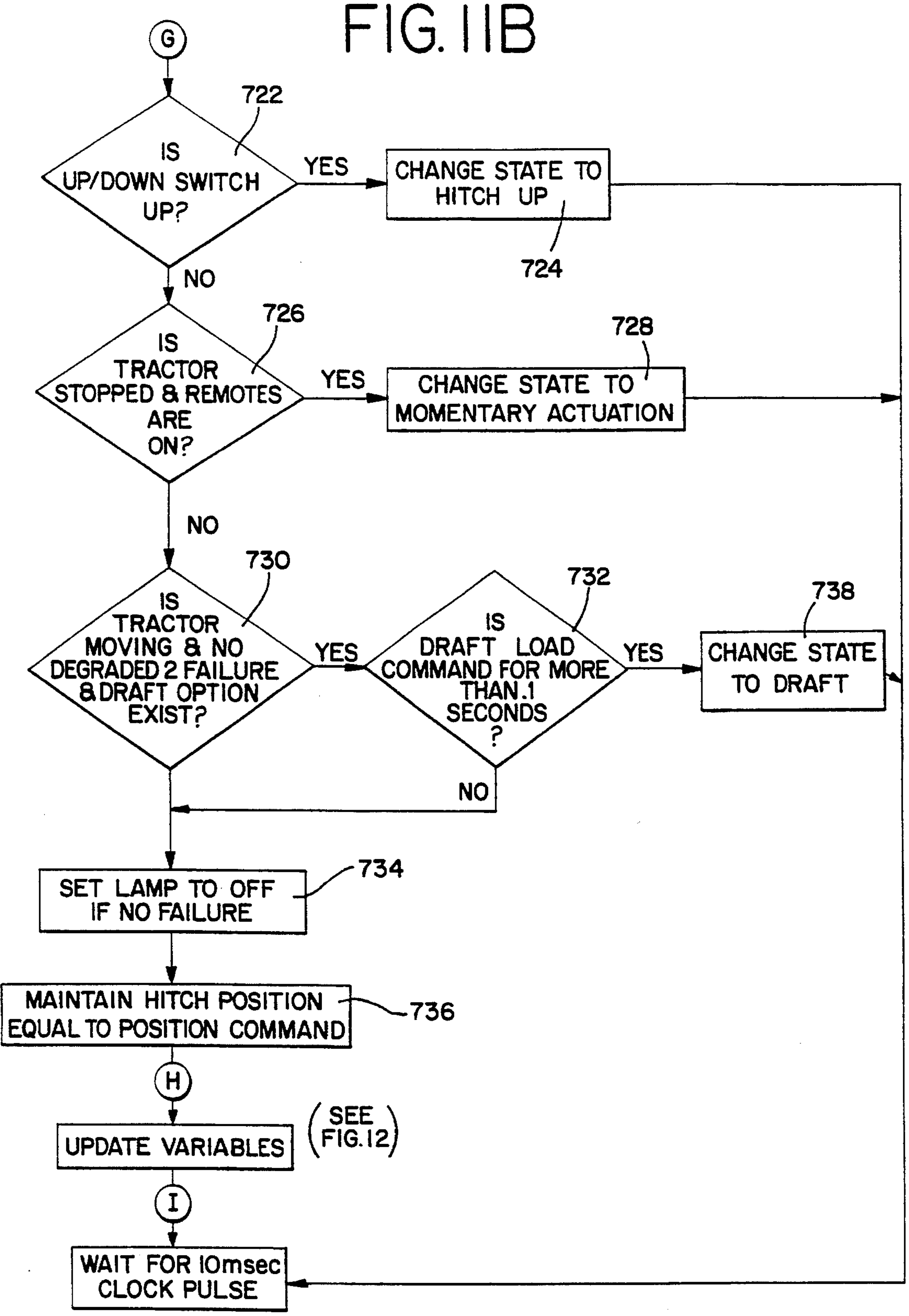
FIG. 11B
G
IS UP/DOWN SWITCH UP?
722
YES
CHANGE STATE TO HITCH UP
724
NO
IS TRACTOR STOPPED & REMOTES ARE ON?
726
YES
CHANGE STATE TO MOMENTARY ACTUATION
728
NO
IS TRACTOR MOVING & NO DEGRADED 2 FAILURE & DRAFT OPTION EXIST?
730
YES
IS DRAFT LOAD COMMAND FOR MORE THAN .1 SECONDS ?
732
YES
CHANGE STATE TO DRAFT
738
NO
SET LAMP TO OFF IF NO FAILURE
734
MAINTAIN HITCH POSITION EQUAL TO POSITION COMMAND
736
H
UPDATE VARIABLES
(SEE FIG.12)
I
WAIT FOR 10msec CLOCK PULSE G
IS UP/DOWN SWITCH DOWN?
754
YES
756
CHANGE STATE TO POSITION
NO
758
760
IS TRACTOR STOPPED & REMOTES ARE ON?
YES
CHANGE STATE TO MOMENTARY ACTUATION
NO
SET LAMP TO OFF IF NO FAILURE
762
MOVE HITCH UP & MAINTAIN HITCH POSITION=UPPER LIMIT
764
H
UPDATE VARIABLES
(SEE FIG.12)
I
WAIT FOR 10msec CLOCK PULSE G
766
IS TRACTOR NOT STOPPED OR REMOTES NOT ON OR (DOWNM OR UPM NOT ON & LIMP)?
YES
CHANGE STATE TO ENABLE
768
NO
MAINTAIN HITCH RAISE & LOWER RATES
770
SET LAMP TO FLASHING IF NO FAILURE
772
H
UPDATE VARIABLES
(SEE FIG. 12)
I
WAIT FOR 10msec CLOCK PULSE HITCH LOAD
HITCH POSITION
MAX.
MIN.
ΔD
Φ
902
904
906
908
908'
908"
910
914
916
1
7
10
a
b
c
d
e

CONTROL SYSTEM FOR AGRICULTURAL VEHICLE AND CALIBRATION METHOD FOR SUCH CONTROL SYSTEMS

CROSS-REFERENCES AND RELATED DOCUMENTATION

This is a continuation-in-part application pursuant to 37 C.F.R. §1.53(b) of U.S. patent application Ser. No. 08/118, 450, filed on Sep. 8, 1993, now U.S. Pat. No. 5,421,446.

This application includes a microfiche appendix including one microfiche and ten frames.

A portion of the disclosure of this patent document contains material which is subject to a clam of copyright protection. The copyright owner has no objection to the reproduction by anyone of the patent document or the patent disclosure as it appears in the Patent and Trademark Office patent file or records, but otherwise reserves all other rights whatsoever thereto.

FIELD OF THE INVENTION

The present invention generally relates to hitch assemblies connected to a frame of an off-highway implement and, more particularly, to an electronic control system for controlling operation of the hitch assembly, and a calibration method for such control systems.

BACKGROUND OF THE INVENTION

Various types of hitch control systems have been heretofore designed, used and proposed. The purpose of each of these systems is to control the elevation of the hitch assembly thereby maintaining the ground penetration of the equipment or ground engaging assembly attached to the hitch assembly at a substantially constant depth during its operation.

Most conventional hitch control systems include simple controls for setting the depth of ground penetration by the ground penetrating equipment adapted to be attached to the hitch assembly. Known systems include a hitch command lever which sets the preferred elevational position of the hitch assembly and thereby the depth of ground penetration equipment and a "mix" control which regulates the draft load sensed by the hitch assembly and resulting from the ground interaction with the assembly being positioned by the hitch assembly. Changing soil conditions in any particular field being worked or in different fields, however, make such heretofore known systems inadequate. As will be appreciated by those skilled in the art, such known systems offered limited adjustability of the control systems to changing field conditions and, thus, complicate operations for the owner who may have thousands of acres of land with different soil characteristics throughout the various fields. Moreover, once such systems are set, there is no opportunity for the operator to make on-going changes to the hitch assembly setting in response to changing conditions in the field being worked.

Hitch assemblies are designed to work with a myriad of different ground engaging and penetrating assemblies or equipment. The limited ability to adjust the heretofore known systems, limits the ability of the system to adjust to changes associated with the assemblies or equipment attached thereto. Thus, the versatility of the implement is substantially reduced thereby increasing the cost to the farmer.

The heretofore known hitch control systems tend to vigorously respond to changes in sensed draft loads being applied to the hitch assembly. While a vigorous response may be appropriate in some circumstances, the changes to the hitch loading can result in an inconsistent ride for the operator which quickly wears on the operator throughout a day of field operations. On the other hand, the inability of the hitch control assembly to respond to changing load conditions imparted to, the hitch assembly impacts on the engine performance and wear.

Most hitch control systems are capable of operating in more than one operating state. For example, if the off-highway implement is being driven across a field with the ground engaging equipment or assembly attached thereto being adapted to either engage or penetrate the ground, the control system preferably operates the hitch assembly in a DRAFT state. On the other hand, some hitch assemblies operate satisfactorily in a POSITION state during which the hitch assembly moves between two positions. When the ground penetrating equipment is being initially connected to the hitch assembly, most hitch assemblies include remote switches to facilitate raising or lowering the hitch assembly from an area remote from the operator station of the implement. To allow for operation of the remote switches, the control system is operable in a MOMENTARY state. Alternatively, if the assembly is being transported from one location to another as by driving the implement with the assembly attached thereto, the hitch assembly is operated in a HITCH UP state.

While improvements have been made to such control systems, no known control system provides a lower limit to movement of the hitch assembly when it operates in DRAFT state. With known control systems, the hitch assembly and the equipment or assembly carried thereby are substantially free to descend to the mechanical limits of the hitch assembly. The inability to set a lower limit complicates ground penetration in that the equipment can go below the setting selected by the operator thus causing related operational problems for the off-highway implement during the DRAFT state.

Most heretofore known control systems control their descent rate of the hitch assembly to lower the equipment toward the ground from a raised position. Such systems, however, do not consider the weight of the equipment that is attached to the hitch assembly when designing the control systems. Thus, hitch assemblies having relatively large pieces of equipment connected thereto will naturally descend at a faster rate than the hitch assembly will when a smaller piece of equipment attached thereto. During operation of the remote switches, heretofore known control systems tailed to regulate the descent rate of the hitch assembly based on the weight of the equipment connected thereto. The inability to know how fast the such equipment may move toward the ground from a raised or elevated position, can cause serious and costly damage to such equipment as through operator neglect. A damaged piece of equipment can cause further downtime resulting from the repairs or replacement of parts required for the equipment.

Thus there is a need and a desire for a hitch assembly control system which addresses these significant drawbacks associated with the heretofore known control systems and provides the operator with flexibility and assurance of operation which was heretofore unknown.

As increasingly sophisticated control systems are devised, particularly control systems relying upon electronic and microprocessor control, there is also a need for calibration methods designed to enhance control performance. In particular, control by a digital signal processor is simplified and improved if certain values related to physical limits and parameters of the mechanical system, and electrical characteristics of the control system are stored in the processor during a calibration sequence for use throughout the control process. Such parameters would advantageously include the minimum current that may be supplied to solenoid coils to raise and lower the hitch, minimum and maximum hitch positions, minimum and maximum command lever positions, and the mapping of command lever positions on hitch positions.

In addition, such calibration methods are particularly useful where a control system may be installed on various vehicle models, such as within a family of tractors, or where physical or electrical variations may exist between individual machines within a single model. For example, the range of hitch movement may vary greatly between models, such as from 55 to 76 degrees of angular displacement. The range of movement of command hardware can also vary widely. Within a single model of vehicle, variations within manufacturing tolerances inevitably lead to differences between machines, requiring individual calibration of each completed vehicle.

Finally, known control systems, while affording control of certain hitch parameters, such as position or height, based upon the deviation between some command input and a sensed actual value of the parameter, generally do not compensate for changes in physical or electrical characteristics of the control system during operation. For example, upon startup of an agricultural vehicle, a cold battery and electrical system will generally furnish a lower voltage than the rated voltage. As the vehicle warms up during operation, the voltage will generally increase. Similarly, the resistance of solenoid coils in the actuator circuit may change during operation. The failure to account for such changes, and to adapt control signals accordingly can lead to inconsistent control throughout the period of operation of the vehicle. Accounting for such parameter changes entails not only measuring the parameters and calibrating the processor accordingly, but also adjusting control signals based upon changes in the parameter measurements.

SUMMARY OF THE INVENTION

In view of the above and in accordance with the present invention there is provided a control system for a vehicle that includes a battery coupled to the control system and at least one device responsive to control signals from the control system. The control system includes a voltage sensor for generating voltage signals representative of the voltage of the battery. The system also includes a control circuit coupled to the voltage sensor and configured to generate a correction factor based upon the voltage signals and upon a reference voltage signal. The control circuit is also configured to apply the correction factor to control signals.

In accordance with another aspect of the present invention there is provided a control system for a vehicle that includes a battery coupled to the control system, a movable attachment member, and a solenoid operated actuator circuit including a solenoid coil configured to move the attachment member in response to control signals from the control system. The control system includes a measuring circuit configured to generate parameter signals representative of an electrical parameter of the coil, and a control circuit coupled to the measuring circuit. The control circuit is configured to generate a signal correction factor based upon the parameter signals and to apply the signal correction factor to the control signals.

In accordance with a further aspect of the invention there is provided a calibration method for an agricultural vehicle that includes an attachment member suitably configured for coupling to an agricultural implement, an actuator circuit coupled to the attachment member for moving the attachment member between a lower position and a raised position in response to command signals, a sensing device configured to produce a position signal representative of the position of the attachment member, a control circuit configured to receive the position signal and to produce the command signals, and a memory circuit. The method includes the steps of determining a first threshold value by applying a command signal to the actuator circuit, incrementally increasing the magnitude of the command signal, monitoring the position signal from the sensing device, and storing a first threshold value in the memory circuit when the sensing device detects a change in position of the attachment member. In accordance with the method, the foregoing steps are repeated to determine at least a second theshold value, the values are averaged to determine a threshold command value and the threshold command value is stored in the memory circuit.

In accordance with still another aspect of the present invention there is provided a control method for an agricultural vehicle having a battery, a control circuit coupled to the battery and at least one device movable in response to control signals from the control circuit. The method comprises the steps of generating voltage signals representative of the voltage of the battery, generating a correction factor from the voltage signals, and applying the correction factor to the control signals.

In accordance with yet another aspect of the invention there is provided a control method for an agricultural vehicle having a battery, a control circuit coupled to the battery, a movable device and a solenoid operated actuator circuit having at least one solenoid coil. The actuator circuit is coupled to the movable device and configured to move the device in response to control signals from the control circuit. The method comprises the steps of generating parameter signals representative of an electrical parameter of the coil, generating a correction factor from the parameter signals, and applying the correction factor to the control signals.

The objects, aims and advantages of the present invention will become more readily apparent from the following detailed description of the invention, the appended claims, and the following description of the drawings.

DESCRIPTION OF THE DRAWINGS

FIGS. 6 through 12 are flow charts which schematically illustrate various operational steps inherent with the control system of the present invention;

DETAILED DESCRIPTION OF THE PRESENT INVENTION

Figure 1:
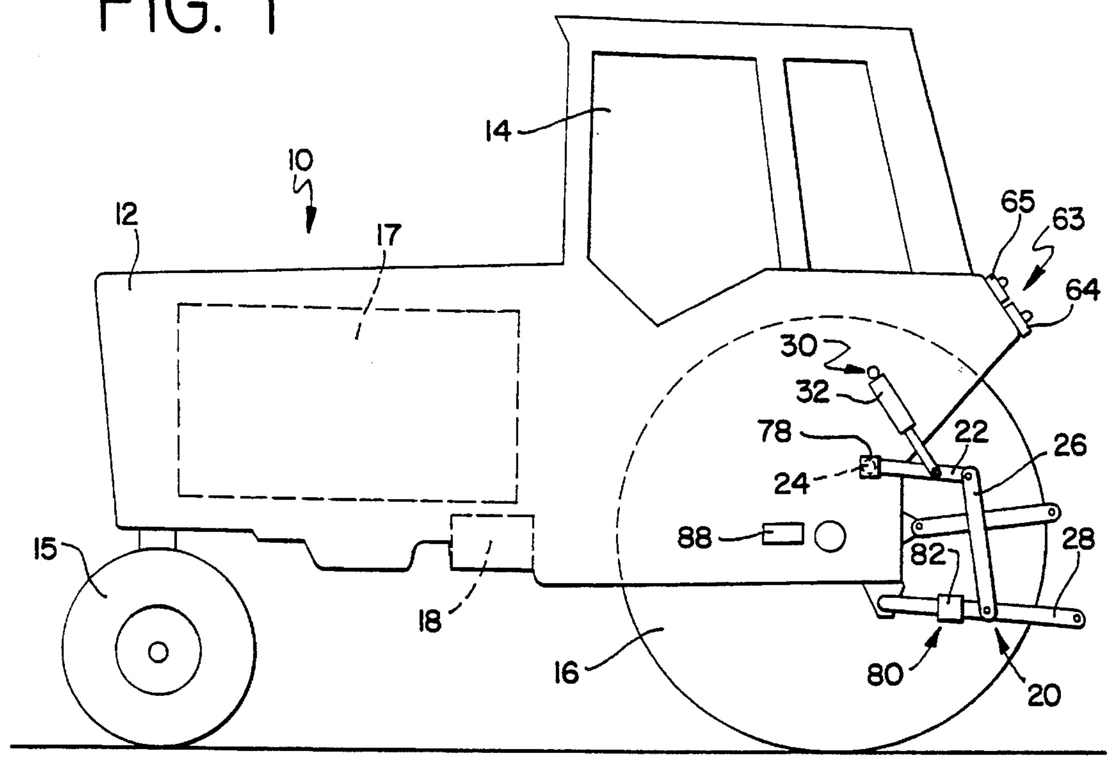
FIG. 1 is a simplified schematic illustration of an off-highway vehicle such as an agricultural tractor which is equipped with a hitch assembly according to the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

In FIG. 1, there is schematically represented an off-highway vehicle such as a tractor 10. Tractor 10 includes an operator station 14 arranged on a frame 12 which is supported for movement across a field by a front pair of steerable wheels 15 and a rear pair of wheels 16. In the illustrated embodiment, wheels 16 are driven through a drive train including an engine 17 mounted on frame 12. The tractor 10 further includes an electrical system having a conventional battery 18. It should be appreciated, however, that the present invention is equally applicable to other forms of off-highway vehicles suited to have hitch assemblies connected thereto, i.e., bulldozers: articulated four-wheel drive tractors, frontwheel drive tractors, or other forms of implements which are supported by tracks rather than wheels. For purposes of this description and without detracting from its spirit or scope, the present invention will be described as being associated with an agricultural tractor.

Tractor 10 is further provided with a hitch assembly 20 which connects a ground penetrating assembly or other form of relatively large equipment to a rear end of the tractor. The ground penetrating assembly may be in the form of a conventional moldboard plow or chisel plow. Alternative forms of ground penetrating assemblies which are adapted to be towed behind the tractor may be likewise connected to the hitch assembly 20 of the tractor without departing from the spirit and scope of the present invention.

Hitch assembly 20 is preferably designed as a three-point hitch and includes a pair of lift arms 22 which are each connected to and extend from a rock shaft 24. As is conventional, a pair of lift links 26 connect the lift arms 22 to a pair of draft links 28. The position of the draft links 28 and, thus, the elevation and working depth of the implement is controlled by a hitch actuator apparatus 30. In the illustrated embodiment, the hitch actuator apparatus 30 preferably includes at least one hydraulic motor or cylinder 32 connected to the hitch assembly 20 and responsive to input signals thereto for controlling the elevation of the draft links 28 of the hitch assembly 20. The above-described hitch assembly is but one example of a hitch mechanism to which the present invention applies and it will be appreciated by those skilled in the art that the present invention is equally applicable to other types of hitch mechanisms.

Figure 2:
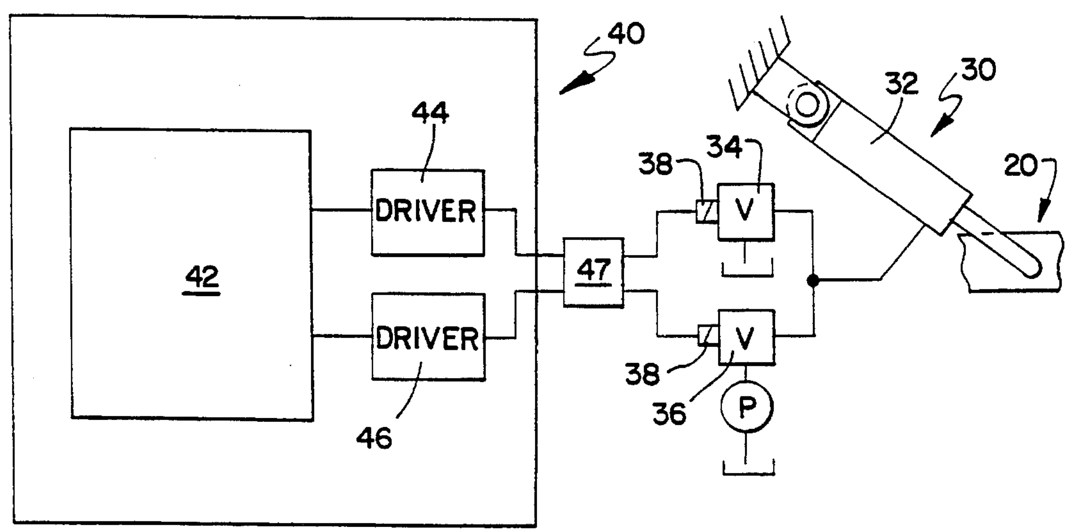
FIG. 2 is a simplified electrical and hydraulic schematic diagram of the control system of the present invention.

As shown in FIG. 2, the hydraulic motor or cylinder 32 is operated in response to the operation of hydraulic valves 34 and 36 which control the flow to and from cylinder 32. For the purposes of the present explanation, valve 34 will be referred to as the raise valve and valve 36 will be referred to as the lower valve. As will be appreciated, the function of valves 34 and 36 can be embodied into a single valve without departing from the spirit and scope of the present invention. In the illustrated embodiment, valves 34 and 36 are preferably designed as solenoid operated valves and each includes an electrical coil 38 and 39 respectively, which operate the respective valve in response to electrical control signals generated by a control system 40. It should be appreciated, however, that other forms of electrically driven mechanisms can be used to position the rock shaft 24 without departing from the spirit and scope of the present invention.

The control system 40 includes a control unit 42 which receives a series of inputs representing different operating characteristics and a pair of valve drivers 44 and 46. The valve drivers are connected to and control operation of the valves 34 and 36 respectively, through a conventional relay 47, and are thus referred to as raise coil 38 and lower coil 39. Preferably, each valve driver 44, 46 is a conventional pulse-width modulated current driver but other forms of drivers are known and can likewise be used to successfully operate the valves in the intended manner.

Figure 3:
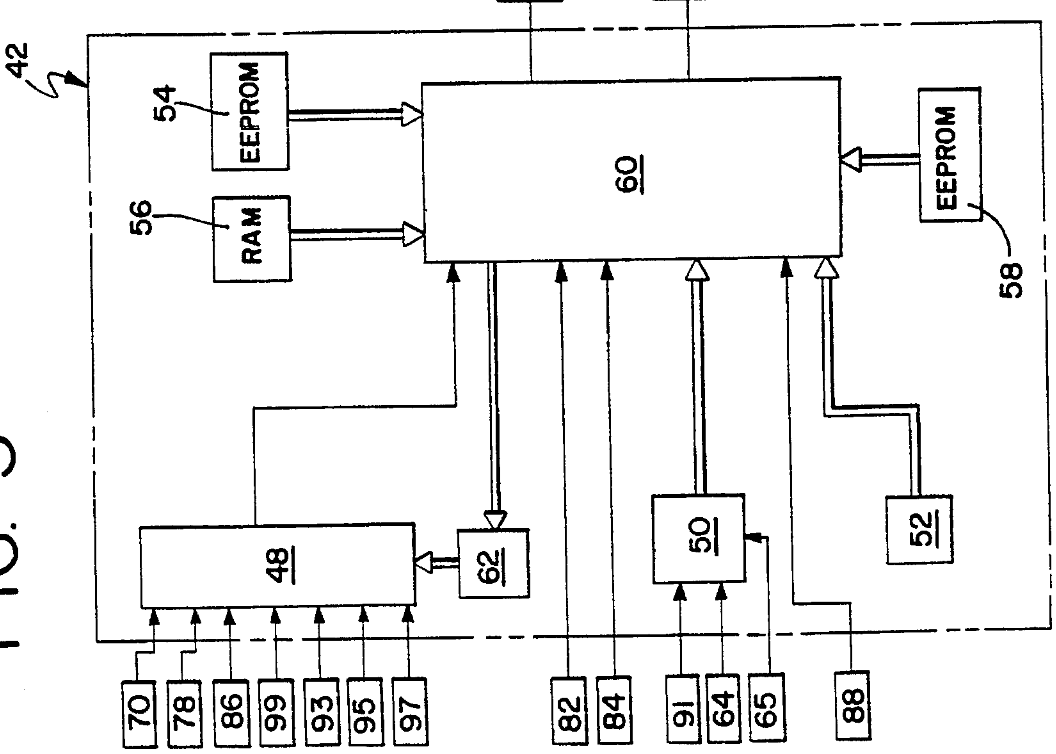
FIG. 3 is an electrical diagram of a portion of the control system of the present invention.

As shown in FIG. 3, the control unit 42 preferably includes an analog switch 48, a first input latch 50, a second input latch 52, an electronically programmable read-only memory (EPROM) 54, a random access memory (RAM) 56, an electrically erasable, programmable read-only memory (EEPROM) 58, and a suitable microprocessor 60 such as an INTEL 80196KB microprocessor. As will be appreciated, data received from various inputs can be either directly received via an internal analog-to-digital converter in the microprocessor or via the analog switch 48, input latch 50, or input latch 52. In the illustrated embodiment, a chip selector 62, controlled by the microprocessor 60, selects the channel or input to be sampled during operation of the hitch assembly 20.

As mentioned above, the hitch assembly 20 can be provided with several different "configurations". The provision of various options arranged in combination with the hitch assembly 20 allows the control system of the present invention to operate the hitch assembly 20 in various states of operation. For example, to enable the hitch assembly to operate in a DRAFT state requires the control system 40 to receive and respond to various inputs from several selectively settable mechanisms. Alternatively, the hitch assembly 20 can be configured with fewer options and yet be operational.

Figure 4:
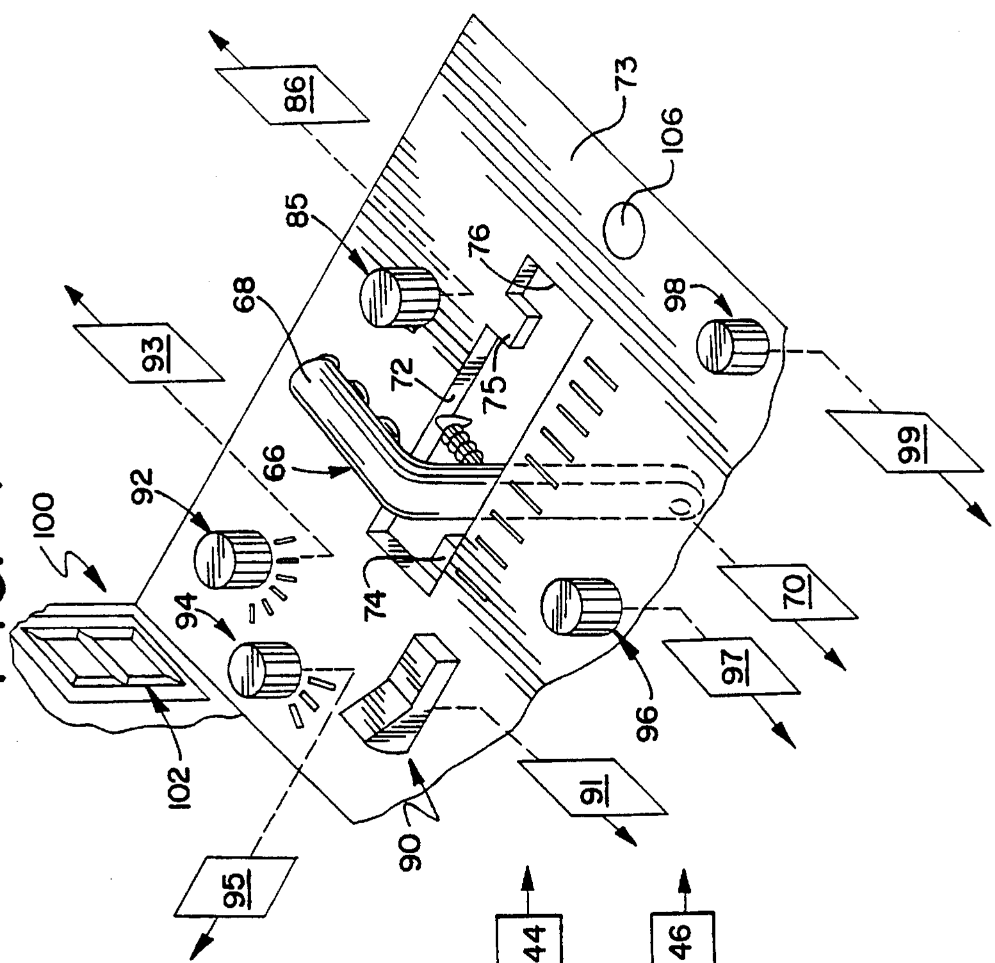
FIG. 4 schematically illustrates a control console arranged in a cab region of the tractor.

Turning to FIG. 4, an operator control command mechanism 66 is arranged in the operator station 14 of the tractor. The command mechanism 66 is satiable in different positions under the influence of the operator for elevationally moving the hitch assembly 20 between an upper position and a lower position and for establishing a desired working depth of the implement connected to the hitch assembly 20.

In the illustrated embodiment, the command mechanism 66 includes an adjustable mechanism 68 (e.g. a movable lever) which is coupled to a signal device such as a transducer or potentiometer 70. Mechanism 68 may be a linearly moveable lever as illustrated in FIG. 3, or any suitable input device such as a knob assembly. The command lever 68 is movable within an elongated slot 72 of a command console 73 preferably arranged in the cab region 14 of the tractor. An adjustable limit stop 74 connected to and carried by the console 73 acts as a mechanical stop for the adjustable mechanism 68 and sets a lower limit stop for the hitch assembly 20. The opposite end 76 of slot 72 likewise acts as a mechanical stop for the mechanism 68 and serves as an extreme upper limit stop for the hitch assembly 20. Protrusion 75 is provided in slot 72 and cooperates with mechanism 68 to maintain mechanism 68 adjacent to end 76, and hence to maintain hitch assembly 20 in its extreme raised position, such as for transport. Depending upon the position of the adjustable mechanism 68, the sensor or potentiometer 70 generates a signal which is delivered to the microprocessor through the analog switch 48; which signal is representative of desired position of the hitch assembly 20.

Returning to FIG. 1, a preferred embodiment of the hitch assembly 20 includes a remote switch assembly 63 for elevationally moving the hitch assembly 20. As shown, the remote switch assembly 63 preferably includes a pair of remote momentary switches 64 and 65 mounted away from the operator station 14 of the tractor 10 and near the rear end thereof. In the illustrated embodiment, remote switch 64 constitutes a momentary UP switch while remote switch 65 constitutes a momentary DOWN switch. Alternatively, a two position switch assembly could be used rather than separate switches 64, 65. In those tractors so equipped, the remote switch assembly 63 (FIG. 1) likewise provides input signals to the microprocessor 60. In the illustrated embodiment, the remote UP switch 64 and the remote DOWN switch 65 each provide a signal indicative of the operative state thereof to the microprocessor 60 preferably through the input latch 50.

Informational data concerning the actual position of the hitch assembly 20 is likewise provided to the control unit 42. In the illustrated embodiment, a sensor 78 such as a conventional rotary potentiometer is used to monitor the angular disposition of rock shaft 24 (FIG. 1) forming part of the hitch assembly. The output signal generated by sensor 78 represents the actual or sensed position of the hitch assembly 20 and, thereby, the position of the implement with respect to tractor 10. The signal from the sensor or potentiometer 78 acts as an input to the analog switch 48. It should be appreciated that sensing the angular disposition of rock shaft 24 is merely exemplary of one method of monitoring or detecting the actual position of the hitch assembly 20 and that alternative methods are well within the spirit and scope of the present invention.

After the implement has penetrated the ground, a draft force will be established from the implement/ground interaction. As shown in FIG. 1, the hitch assembly 20 is provided with a draft sensor assembly 80 for sensing the draft force applied to the hitch assembly 20 through implement/ground interaction. In the illustrated embodiment, the draft sensor assembly 80 includes a pair of sensors 82 and 84 arranged in the left and right draft links 28 of the hitch assembly 20 to monitor or measure the draft force. As shown in FIG. 3, the draft force sensors 82 and 84 are connected to and provide inputs to the microprocessor 60. As will be appreciated, other sensor arrangements could be used for measuring the draft force applied to the hitch assembly without detracting from the spirit and scope of the present invention.

As shown in FIG. 4, the control console 73 further includes a draft force command mechanism 85. The draft force command mechanism 85 is settable in different positions under the influence of the operator for setting a desired level of draft force or draft load to be applied to the hitch assembly 20 during a plowing operation. The different settings or positions of mechanism 85 are measured by a potentiometer 86 or other suitable signalling device. Depending upon the adjusted position of the command mechanism 85, the potentiometer 86 provides a signal to the microprocessor 60 which represents an operator controlled reference draft force. As will be appreciated, the reference draft force setting regulated by mechanism 85 is directly related to the desired depth of the implement during a plowing operation.

A tractor axle speed input signal, which represents the ground speed of the tractor, is also provided to the control system 40. As shown in FIG. 1, a ground speed sensor 88 is arranged on the tractor 10 for measuring the ground speed thereof. Sensor 88 may be of any suitable type which is capable of providing an input signal to the microprocessor 60 which is representative of the ground speed of the tractor.

The control console 73 of the tractor may further include an up/down switch assembly 90 for independently controlling the elevation of the hitch assembly 20 between a lower limit position and an upper limit position independently of the hitch command device 66. Switch assembly 90 is preferably configured as a rocker switch which is selectively movable between an UP position and a DOWN position. In a preferred form of the invention, switch assembly 90 can also be moved to a DOWN M position. The DOWN M position of switch assembly 90 is accessible from the DOWN position and is a momentary position which is maintained as long as the operator holds the switch assembly 90 in this position. A suitable sensor 91 or the like monitors the three possible positions of the switch assembly 90 and provides any of three output signals indicative of the position of the switch assembly 90. The signals from the sensor 91 are inputted to the microprocessor 60 through input latch 50.

The control console 73 further includes an operator controlled descent mechanism 92. The purpose of the descent mechanism 92 is to enable the operator to control the rate at which the hitch assembly 20 moves from a higher position to a lower position. The descent 25 mechanism 92 is selectively adjustable by the operator and includes a conventional potentiometer 93 or other suitable device for providing a signal representative of the operator selected drop rate for the hitch assembly 20 to the microprocessor 60 through the analog switch 48. In the illustrated embodiment, the drop rate selected by the operator controls the descent rate of the hitch assembly independent of the weight of an implement attached to the hitch assembly 20.

In a preferred form of the invention, an upper limit knob assembly 94 is provided to allow the operator to set or limit the maximum vertical movement of the hitch assembly 20 independently of the hitch command device 66, thereby avoiding inadvertent errors which could be incurred with movement of the control lever 68 between positions. The upper limit knob assembly 94 is satiable in different positions under the influence of the operator thereby allowing for adjustment of the upper limit of the hitch assembly 20. In the illustrated embodiment, a conventional potentiometer 95 or other suitable device provides an input signal indicative of the setting of the upper limit knob assembly 94 and, thus, the upper limit of the hitch assembly 20, to the microprocessor 60 preferably through the analog switch 48.

For accommodating changes in field and/or soil conditions and a myriad of other considerations, the control system 40 of the present invention further receives input signals from a travel knob or apparatus 96 preferably arranged in the area of console 73. As will be described in detail below, the travel apparatus 96 is an operator adjustable knob-like mechanism which, during operation of the implement attached to the hitch assembly, allows the hitch assembly 20 to move within a predetermined vertical range independently of the desired settings selected by the hitch command mechanism 66 and draft force command mechanism. The travel apparatus 96 is movable through a range of settings; with each setting on the travel assembly 96 allowing for a predetermined range of vertical travel of the hitch assembly 20. A conventional potentiometer 97 or other suitable device provides an input to the microprocessor 60 indicative of the setting of the travel apparatus 96. Notably, the range of travel allowed by the travel apparatus 96 has a linear function relation to elevational movements of the hitch assembly 20 in DRAFT state for a constant draft load.

Moreover, the control system 40 receives input signals from a response assembly 98 likewise arranged on or in the area of the console 73. The purpose of the response assembly 98 is to control the response rate or response time period over which the hitch assembly 20 vertically moves to maintain a substantially constant predetermined force on the hitch assembly during operation of the implement attached to the hitch assembly in DRAFT state. The response assembly 98 is an operator adjustable device which is satiable through a range of positions; with each position setting being determinative of a different response time for the hitch assembly 20. A conventional potentiometer 99 or other suitable device provides an input signal representative of the operator selected response rate set by the response assembly 98. The signal from the potentiometer 99 is preferably received by the microprocessor 60 through the analog switch 48.

A series of other analog inputs indicative of various operating components on the tractor 10 may likewise be provided to the microprocessor 60 of the control unit 42. Examples of such inputs include: voltage of the battery 18; operativeness of the coils 38 and 39 used to operate the valves 34, 36, the current through the coils when energized, or the resistance of the coils, for instance through inputs 35 and 37 coupled to a suitable monitoring circuit such as will be described; a regulator voltage; and etc. These inputs are preferably provided to the microprocessor 60 of the control unit 42 through the analog switch 48, the input latch 50, the input latch 52 or any suitable combination thereof. Certain of these values are preferably provided during a calibration sequence as will be discussed below. During operation of the tractor 10, values determined during the calibration sequence, such as battery voltage, current through the coils 38 and 39 when energized, or the resistance of coils 38 and 39, may be updated or otherwise utilized by the microprocessor 60 to generate correction factors to be applied to control signals to obtain consistent control performance throughout the operation of the tractor, as will be described.

Figure 5:
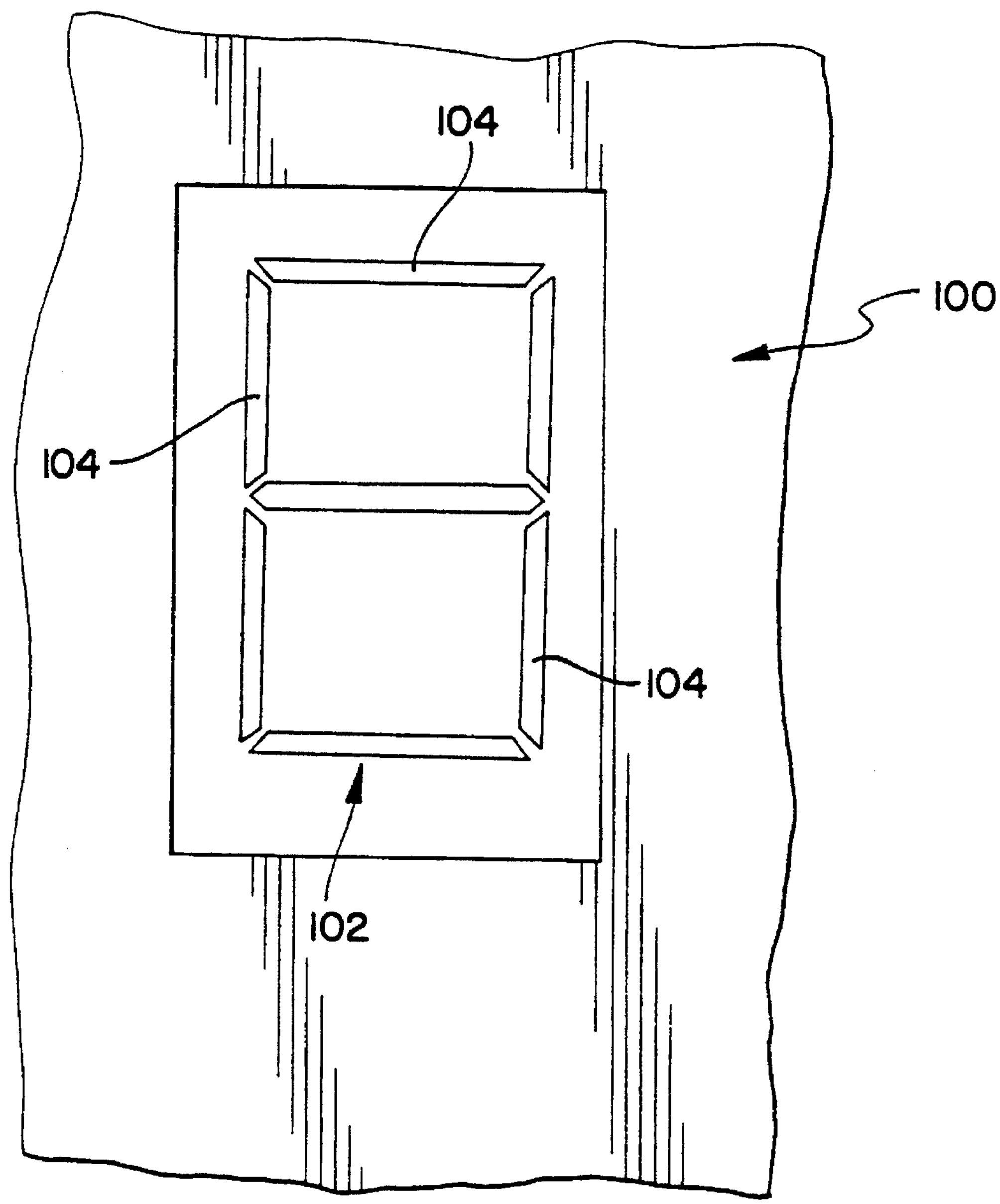
FIG. 5 is an elevational view of an indicator assembly forming part of the present invention.

In accordance with another feature of this invention, and as shown in FIG. 4, an indicator assembly 100 is arranged preferably in the area of the control console 73. As shown in FIG. 5, the indicator assembly 100 preferably includes an alphanumeric display 102 for illustrating various diagnostic information related to the operation of the hitch assembly 20. The alphanumeric display 102 is preferably comprised of a series of illuminable elements 104 arranged in a predetermined pattern relative to each other. As will be described in detail hereinafter, the control unit 42 includes suitable driver circuitry for operating the alphanumeric display 102 in a manner yielding an informational message to the operator, for example, regarding a short in the electrical coils 38 or 39 of the valves 34, 36. Other instructional messages are also provided, directed to the correction or repair of various errors detected in the hitch assembly 20.

Returning to FIG. 4, the control console 73 further includes an indicator light 106. As will be described in detail hereinafter, suitable electrical circuitry within the control unit 42 operates the light 106 in any of three different modes or conditions: (1) OFF; or (2) FLASHING; or (3) ON. The particular operating condition of the light 106 reflects the operational state or condition of the hitch assembly 20.

The control system operates under the influence of a control algorithm executed by the microprocessor 60. Operation of the control system under the influence of the algorithm is schematically represented in the flow chart shown in FIG. 6.

As shown in FIG. 6, the control system 40 is preferably enabled concurrently with starting of the engine 17 on the tractor at step 110. At step 200, various variables and hardware are initialized. As will be discussed in detail hereinafter, the control sequence represents a continuous timed cycle or loop during which various operating conditions and various parameters for several different states of hitch operation are analyzed.

The subroutines involved with the initialization step 200 are schematically illustrated in FIGS. 7A through 7D. The program begins with initialization of the microprocessor 60 at step 202. At step 204, the indicator assembly 100 (FIG. 4) is shut OFF such that no visual indication will be provided on the display 102. In step 206, electrical current, if it exists, to the coils 38 or 39 for the valves 34, 36 is interrupted thus disabling the hitch assembly 20 and thereby preventing inadvertent hitch assembly movement. At step 208, variables associated with various hitch assembly components, i.e., the pulse width modulated drivers 44, 46, are set to predetermined values. At step 210, various memories (EPROM 54 and RAM 56) of the microprocessor 60 are checked.

If the memories of the microprocessor 60 are acceptable, step 212 of the program directs the program to step 214 whereat a conventional software watchdog timer associated with the microprocessor 60 is checked for operativeness. In the illustrated embodiment, the watchdog timer of the microprocessor is reset about every 10 milliseconds by the software at each cycle or loop. If the watchdog timer times out, the system shall be reset and electrical currents to the coils 38 and 39 will be set to zero. If the memories associated with the microprocessor 60 are not acceptable, step 212 shifts the control system 40 into a HALT mode or condition represented by step 213 and from whence to step 2 14. When the control system is shifted into a HALT condition, the hitch assembly is incapable of being driven electronically and the alphanumeric display 102 of indicator assembly 100 provides a suitable informational message to the operator directing attention to the particular problem with the memories and the error is set to be written into the EEPROM 58.

At step 216 operation of the watchdog timer is analyzed. If operation of the watchdog timer is acceptable, analog inputs from the multitude of sensors associated with the hitch assembly are inputted to the microprocessor 60 at step 218. If operation of the watchdog timer is unacceptable, the control system 40 is shifted into a LIMP mode or condition represented by step 217 and from whence the program shifts to step 218. A LIMP condition is less severe than the HALT condition and allows the hitch assembly 20 to be operated within limited parameters.

Figure 7A:
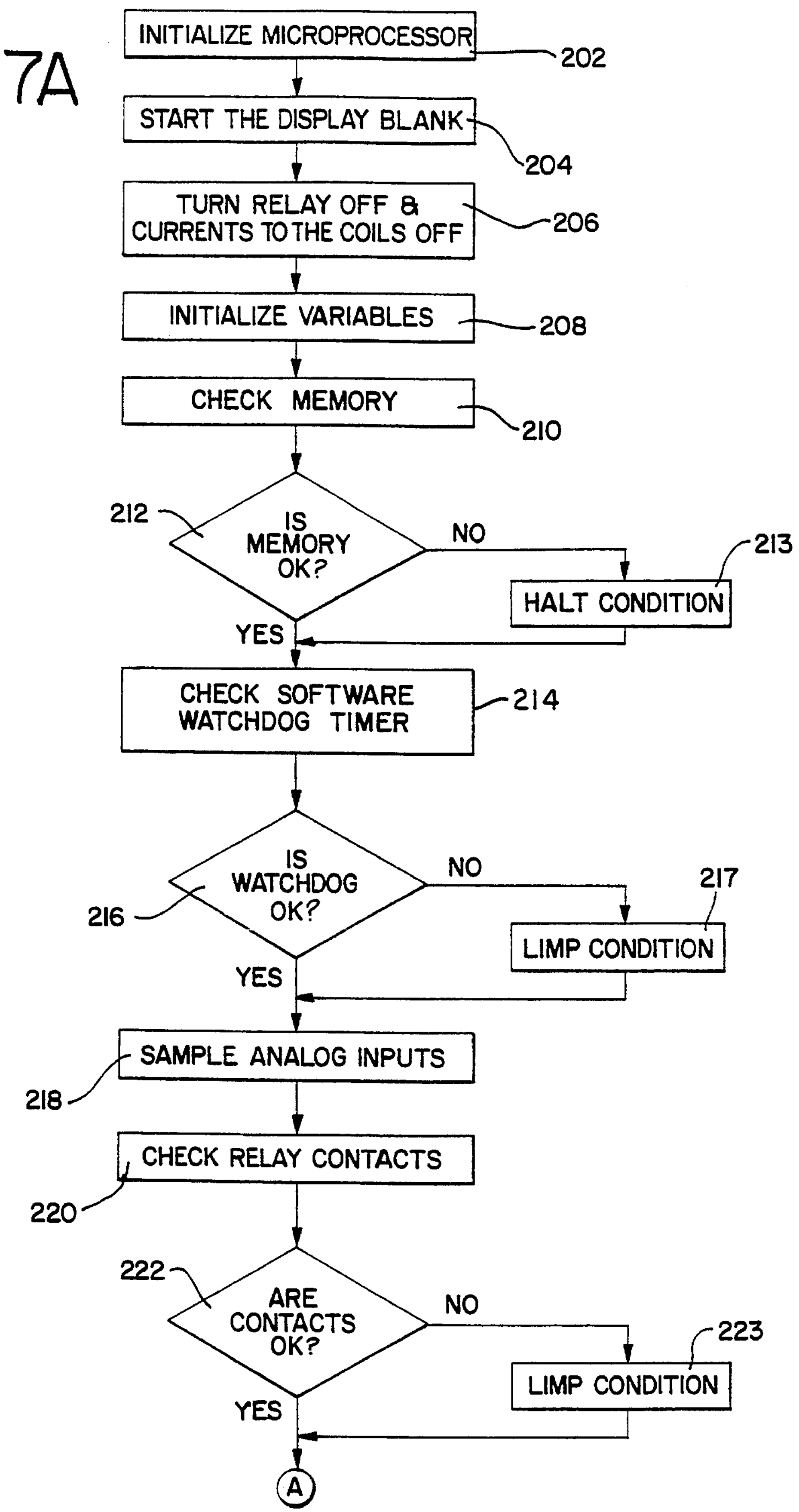
Figure 7B:
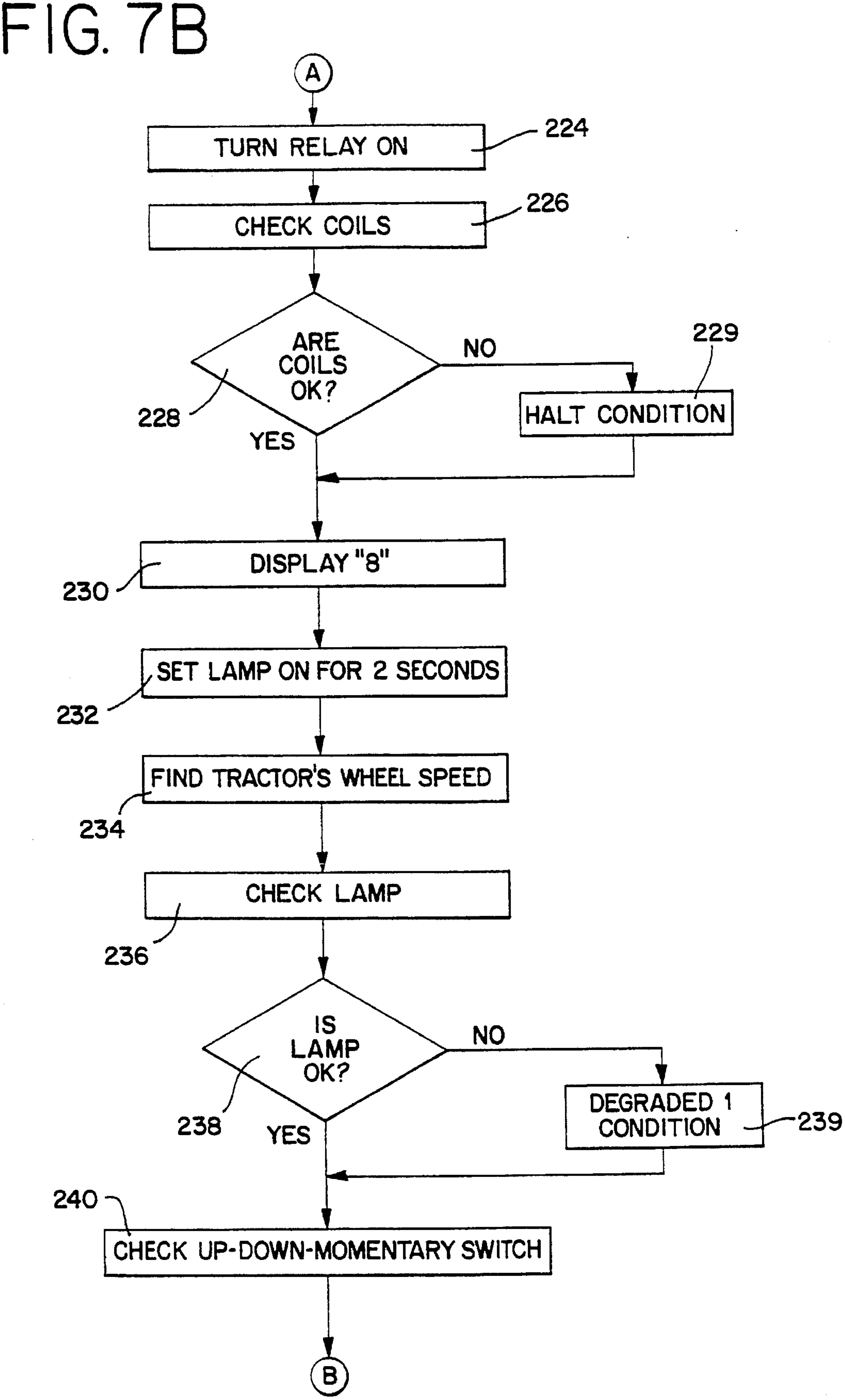

At step 220, the contacts on the relay 47 which energize the coils 38 and 39 of valves 44 and 46 are analyzed to see if such contacts are in working condition. If the relay contacts are working in an acceptable condition, step 222 directs the program to step 224 (FIG. 7B). At step 224, the relay coil 47 (FIG. 2) is energized to detect failure thereof.

If the relay contacts are non-operational, step 222 shifts the control system 40 into a LIMP condition represented by step 223 and from whence the program shifts to step 224. As mentioned above, during a LIMP condition the hitch assembly is limited in its operation.

At step 226 in the program, the coils 38 and 39 for the valves 44 and 46 are checked to analyze their operation. If the coils 38 and 39 operate in an approved manner, step 228 directs the program to step 230. If either of the coils 38 or 39 for the valves 44 and 46 should be determined to be inoperative or faulty, step 228 shifts the control system into a HALT condition represented by step 229 and from whence the program shifts to step 230. During this initialization phase, one count of failure of the coils 38 or 39 is sufficient to shift the control system into a HALT condition. Normally, in a timed cycle, more than one detection of a faulty coil 38 or 39 is required to shift the control system into a HALT condition.

At step 230 of the program, all the illuminable elements 104 of the alphanumeric display 102 are powered for a predetermined period of time. Providing power to all the illuminable elements 104 of the display 102 provides a visual indication whether the circuitry or the indicator assembly 100 is operative.

At step 232 in the program, the indicator light or lamp 106 is turned ON for a predetermined time period preferably approximating two (2) seconds for a future check. As mentioned above, the indicator light 106 operates in three (3) different modes or conditions: (1) OFF; or (2) FLASHING; or (3) ON. A FLASHING indicator light indicates that the program for operating the hitch assembly 20 is in an ENABLE state. When the indicator light 106 is OFF the operator is provided with a visual indication that the control system has been analyzed and the hitch assembly is working properly. When the indicator light 106 is ON or illuminated, it provides a visual indication of a failure condition and alerts the operator to look to the indicator display assembly 100 for an informational message concerning the status of the hitch assembly.

At step 234 the computer program analyzes the ground speed of the tractor 10. That is, at step 234, the computer determines whether the tractor is moving or is stopped. If the tractor is moving certain features of the program can be accessed. That is, if the tractor is moving, the program can be shifted into a DRAFT state of operation (described in detail below). If the tractor is moving, however, the system cannot calibrate various parameters of the hitch assembly and the remote switches 64, 65 of the remote switch assembly 63 are disabled. If the program detects at step 234 that the tractor is not moving, calibration of the hitch assembly can be achieved and the remote switches 64, 65 for controlling operation of the hitch assembly are enabled. If the tractor 10 is stopped, however, the program cannot be shifted into a DRAFT state of operation.

At step 236, the indicator light 106 is checked for operation. If the indicator light 106 is operational, step 238 allows the program to proceed to step 240. If the indicator light 106 is inoperative, the program for the control system is shifted into a DEGRADED 1 mode or condition at step 239 and then the program proceeds to step 240. The operation of the control system in DEGRADED modes will be discussed in greater detail below.

At step 240, the program determines the operativeness of the up/down switch assembly 90 on the control console 73. That is, at step 240, a determination is made whether the switch assembly 90 is operating properly and to evaluate whether the switch assembly is positioned UP, or DOWN, or DOWN M.

After determining the operativeness of the switch assembly 90 at step 240, the program moves to step 242 (FIG. 7C) whereat a determination of whether the tractor is stopped is made. If the tractor 10 is not stopped, step 242 directs the program for the control system 42 to step 244 and no calibration of the system is effected notwithstanding the condition of the up/down switch assembly 90. On the other hand, if the tractor 10 is stopped, step 242 directs the program for tile control system to step 246.

At step 246, an evaluation of the condition of the up/down switch assembly 90 is analyzed. Step 246 enables the program to evaluate whether calibration of the system is being requested. That is, if the up/down switch assembly 90 is in either an UP or DOWN condition, step 246 directs the program to step 244. If, on the other hand, the switch assembly 90 is positioned in a DOWN M condition, step 246 directs the program into a calibration mode at step 248. As will be appreciated, for calibration of the hitch assembly to be successful, no load shall be attached to tile hitch assembly 20 during the calibration mode.

Calibration for the hitch assembly 20 begins at step 248. At step 250, the program waits for the expiration of a predetermined period of time which, in the preferred embodiment, generally equals about two (2) seconds. After the expiration of about two (2) seconds, the program shifts to step 252 whereat the condition of the up/down switch assembly 90 is again evaluated.

Step 254 of the program determines whether the control unit 42 is shifted into a calibration mode. If the switch assembly 90 is detected to no longer be in a DOWN M position at step 254, the program of the control system begins a calibration mode of operation. On the other hand, if, at step 254, the switch assembly 90 is detected to remain in a DOWN M position, the program shifts to step 256.

At step 256, the program conditions the alphanumeric display 102 of the indicator assembly 100 (FIG. 4) to provide a visual indication of the operativeness of the switch assembly 90. Step 256 further directs the program of the control system to step 244 from which the control system advances to step 245 where the operativeness of the EEPROM 58 is checked.

Step 260 directs the program of the control unit after checking the EEPROM 58. If the EEPROM 58 found to be operative, the program shifts to step 262 to determine whether calibration of the variables associated with the hitch assembly 20 have ever been accomplished. If the EEPROM 58 is faulty, step 260 directs the program into a HALT condition represented by step 263 and from whence the program shifts to wait expiration of the watchdog timer.

Step 262 directs the program of the control system as a function of whether calibration of the variables has ever been accomplished. If calibration of the hitch assembly 20 has never been accomplished, the program of the control system is shifted into a HALT condition represented by step 263 and, thus, the hitch assembly will not be permitted to operate. If calibration of the hitch assembly has been previously accomplished, the state of the hitch assembly 20 is known and the program is thereafter directed to step 264 which shifts the state of the hitch assembly 20 into an ENABLE state. After setting the program to the ENABLE state at step 264, the program shifts to step 266 whereat a software flag or the like is set to indicate that the hitch assembly is not enabled. As will be discussed in detail hereinafter, the software flag set at step 266 could be set to enable as a result of acts of the operator (see FIG. 11A, step 716).

At step 268 a determination is made whether an upper limit assembly or control similar to the upper limit assembly 94 is provided in combination with the hitch assembly. If there is an upper limit assembly, the system shifts from step 268 and enters into the timed closed loop program. If no upper limit assembly 94 is detected at step 268, the upper limit for the hitch assembly 20 is equated at step 270 with the maximum range of hitch movement for the hitch assembly and the system thereafter enters into the timed closed loop cycle.

Returning to step 254 of FIG. 7C, if the program detects that the up/down switch assembly 90 is not pushed into a DOWN M position, the program shifts into a calibration mode of operation. During the calibration mode, toggling of the switch assembly 90 between UP and DOWN positions is interpreted by the program to indicate NO whereas moving the switch assembly into a DOWN M position indicates YES. With the present invention, and during the calibration mode of operation, the switch assembly 90 becomes an interface between the operator and the hitch assembly 20 and the alphanumeric display 102 acts as a screen for the operator's viewing.

FIG. 7D schematically represents the steps involved in the program to effect calibration of the hitch assembly parameters. During a calibration mode, a series of questions are posed to the operator by displaying different letters on the indicator assembly 100 and the operator answers the questions by positioning and toggling the switch assembly 90. Calibration for the hitch assembly parameters begins at step 272 whereat an alphanumeric letter representative of the question—Do you want to calibrate?—is displayed on the indicator assembly 100. As mentioned above, with the present invention, YES and NO answers during calibration mode are determined by the position of the up/down switch assembly 90. With preferred embodiment, if calibration is requested, the operator selects the DOWN M position for the switch assembly 90. In response to a YES answer at step 272, the program shifts to step 274.

Alternatively, the operator may toggle the switch assembly 90 between UP and DOWN positions to indicate that calibration is not requested and to enable the operator to read errors. If the operator provides a NO answer at step 272, as by toggling the switch assembly 90, the program shifts to step 276. At step 276, errors previously recorded to the EEPROM 58 are displayed on the alphanumeric display 102 of indicator assembly 100 (FIG. 4) to enable the operator to read the errors. Toggling of the switch assembly 90 between DOWN and DOWN M changes the error indication on the indicator assembly 100 so that the operator can evaluate the different errors that were previously detected. The operator may continue to read the errors until a predetermined alphanumeric configuration is provided on the indicator assembly 100 which indicates that there are no further errors.

After reading the errors at step 276, the program shifts to step 278. At step 278 an alphanumeric representation of the question—"Do you want to keep errors?"—is displayed on the indicator assembly 100. At this point, if the operator desires to keep the errors, the switch assembly 90 is appropriately toggled to effect such ends. On the other hand, if the operator desires to erase the errors, the switch assembly 90 is positioned to shift the program to step 280 wherein the errors are erased from EEPROM 58 memory. From steps 278 and 280, the program is directed to step 244 (FIG. 7C).

If calibration is requested at step 272, the system will transition to step 274. In the preferred embodiment, calibration is divisible into: calibration of the hitch assembly configuration; and calibration of the hitch assembly parameters. At step 274, a determination is made whether certain failures detected of the hitch assembly during initialization step 200 prevent calibration of the system. If certain failures were detected during the initialization step 200, step 274 directs the program to step 282 whereat calibration of the system is aborted. In step 284, the alphanumeric display 102 of indicator assembly 100 is illuminated with an informational message indicative of the reason for the abortion at step 282. From step 284, the program proceeds to return to step 244.

If calibration of the hitch assembly is not aborted, step 274 directs the program to step 286. During the calibration process, various parameters for the hitch assembly are set to predetermined levels. An example of the calibration process might involve a determination of the threshold current levels required for raising and lowering the hitch, battery voltage, coil resistance and any of the series of other parameters involved with the hitch assembly at the time of calibration. The sequence of steps involved in a typical calibration will be discussed below in reference to FIG. 14.

At step 288, the program is evaluated to determine if there are failures with the various components associated with the hitch assembly 20 while the system is in calibration and further looks to determine whether the failures relate to the operator's request to abort or to component failure. If there are failures, step 288 shifts the program to abort calibration at step 282. Otherwise, the system is shifted to step 290 whereat the values sensed during the calibration step at 286 are compared to predetermined values to determine the relation therebetween. If the calibrated values are not within a predetermined acceptable range, step 290 shifts the system to step 292. At step 292, the failure is displayed on the display assembly to indicate what was encountered during calibration and to provide a visual indication that such failure was exclusive to the calibration mode. From step 292, the program shifts to step 294 which transitions the system to a HALT condition and from thence to step 244. If the parameters sensed during the calibration mode are within a predetermined range, the calibration values are provided to the EEPROM memory 58 at step 296. From step 296, the program is directed to step 244 as shown in FIG. 7C.

After the initialization step 200 for the hitch assembly 20 has been completed, the program is passed into a continuous timed closed loop or cycle. As schematically illustrated in FIG. 6, the timed loop begins at step 300 and proceeds to step 400.

Figure 8:
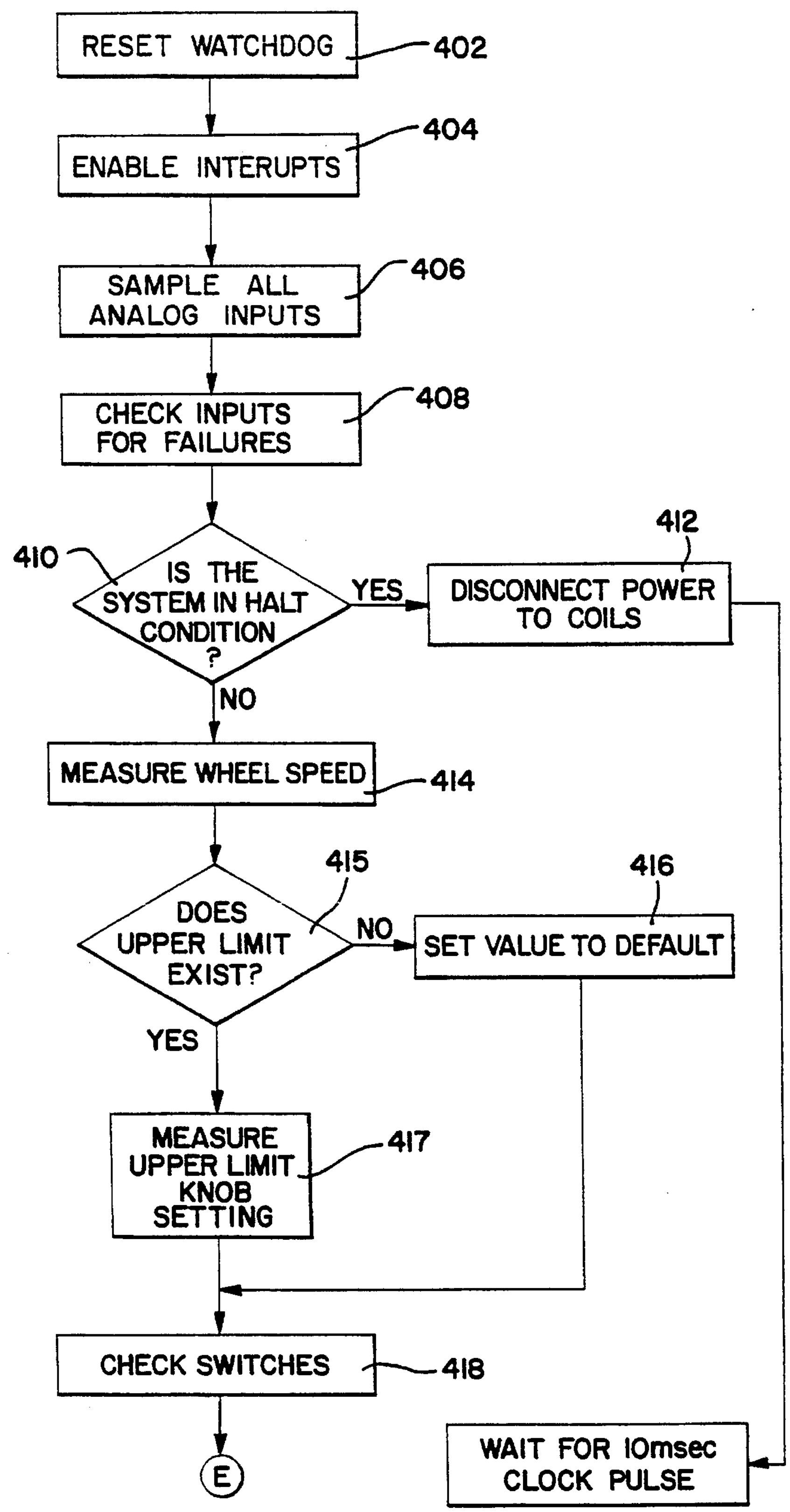

During step 400 all the inputs to the microprocessor 60 are sensed and checked for errors to determine the operability of the hitch assembly 20. The steps involved with step 400 are schematically illustrated in FIG. 8. At step 402, the watchdog software timer which was checked at step 214 and which is involved with the closed loop is reset. At step 404, the interrupts to the microprocessor 60 are enabled.

At step 406, all the analog inputs to the microprocessor 60 from the various sensors on the hitch assembly are sampled. After sampling the analog inputs at step 406, the program is directed to step 408 whereat the inputs are checked for failures. An example of the reviews accomplished at step 408 is comparing the output of the hitch position sensor 78 against its minimum and maximum possible readings. After checking various analog inputs for failures, the program is directed to step 410 which determines if the control unit is in a HALT condition. If the control unit is in a HALT condition, the program is shifted to step 412 which disconnects power to the relay coil 47 thereby disabling vertical movements of the hitch assembly under the influence of the valves 34 and 36 (FIG. 2).

On the other hand, if the control unit is not in a HALT condition, the program is shifted to step 4 14 whereat the ground speed of the tractor is evaluated. Analysis of the ground speed of the tractor at step 414 allows certain hitch assembly operations to be inhibited i.e., calibration or remote actuation of the hitch assembly if the tractor is moving.

The program then shifts to step 415 whereat a determination is made on whether an upper limit exists for the hitch assembly 20. If there is no upper limit knob assembly such as 94 for variably setting the upper limit for the hitch assembly, the program shifts to step 416 whereat the maximum possible range of vertical upward movement for the hitch assembly 20 is set. After the maximum possible range of vertical upward movement for the hitch assembly is set at step 416, the program shifts to step 418. On the other hand, if the tractor 10 is equipped with an upper limit knob assembly such as 94, the program shifts to step 417 whereat the upper limit of movement of the hitch assembly is being measured. From step 417, the program shifts to step 418. At step 418, the program evaluates the operativeness of all the switches associated with the hitch assembly 20.

Returning to FIG. 6, after sensing the analog inputs and checking for errors at step 400, the program of the control unit 42 is thereafter shifted to step 500. At step 500, errors are detected and their severity is categorized. The severity of the errors can be categorized as DEGRADED 1 or DEGRADED 2 or LIMP.

The steps involved with step 500 are schematically illustrated in FIGS. 9A and 9B. The error evaluation begins at step 502 to determine whether any of the inputs analyzed in step 400 are the equivalent of a DEGRADED 1 type failure. In the preferred embodiment, a DEGRADED 1 is the least severe error which allows the system to continue to operate, with the function that failed receiving a default value. Examples of DEGRADED 1 failures include one of the sensors 82, 84 associated with the draft links 28 tailing, the circuitry associated with the decent mechanism 92 failing, the circuitry associated with the response assembly 98 failing, etc.

If no DEGRADED 1 type failure is detected at step 502, the program shifts to step 508. However, if a DEGRADED 1 type failure is detected at step 502, the system shifts to step 504 where a software counter associated with DEGRADED 1 conditions is incremented. After incrementing the DEGRADED 1 counter, the system shifts to step 506 where an evaluation is made of whether the DEGRADED 1 software counter is full. If the DEGRADED 1 software counter is not full, the program shifts to step 516.

If at step 502 no DEGRADED 1 type failure is detected, the program advances to step 508. If at step 508 the count in the DEGRADED 1 counter is greater than zero, the program shifts to step 510 where the DEGRADED 1 counter is decremented. If the count in the DEGRADED 1 counter is not greater than zero, the program shifts to step 512 wherein the count of the DEGRADED 1 counter is again reviewed.

If the count in the DEGRADED 1 software counter at step 512 is equal to zero, the system shifts to step 514 to determine if the source of the failure is the travel knob or apparatus 96 in the DRAFT state. If the travel knob or apparatus 96 has failed, the system is shifted to step 516. On the other hand, if the travel knob 96 has not failed, the system is shifted to step 515 wherein the DEGRADED 1 mode of the system is erased and the system shifts to step 516. If the count in the DEGRADED 1 software counter at step 512 is not equal to zero, the system shifts to step 516.

On the other hand, if the DEGRADED 1 counter is full, step 506 directs the program to step 519 wherein the system is shifted into a DEGRADED 1 mode. As mentioned, in a DEGRADED 1 mode, the system can continue to operate, however, the function that failed will receive a default value. After setting the system into a DEGRADED 1 mode, the indicator light 106 is set "ON" at step 520 to alert the operator to a disfunction or error. At step 522, the alphanumeric display 102 of the indicator assembly 100 is set to provide a visual indication of the errors. At step 524, the failure is set to be written to the EEPROM 58 (see step 804 in FIG. 12). From step 524, the program proceeds to step 516.

Step 516 is the first step in evaluation of a DEGRADED 2 mode. If the program detects that the hitch assembly is operable in a DEGRADED 2 situation, the DRAFT state (as described below) is disabled and the hitch assembly will be permitted to operate only in states other than DRAFT (as described below). The type of errors which constitute a DEGRADED 2 situation involve the failure of the circuitry associated with the draft force command mechanism 85 or that all the draft sensors 82, 84 for measuring the draft force have failed. Alternatively, a DEGRADED 2 mode will be effected if the tractor is configured with single draft sensor and that draft sensor fails.

If no DEGRADED 2 type failure is detected at step 516, the program shifts to step 530. However, if a DEGRADED 2 type failure is detected at step 516, a DEGRADED 2 software counter is incremented at step 526. At step 528, an evaluation is made of whether the DEGRADED 2 counter is full. If the DEGRADED 2 counter is not full, the program is shifted to step 538.

If at step 516 no DEGRADED 2 type failure is detected, the program advances to step 530 where an evaluation is made of whether the DEGRADED 2 counter has a count greater than zero. If the count in the DEGRADED 2 counter is greater than zero, the program is shifted to step 532 whereat the DEGRADED 2 counter is decremented. If the DEGRADED 2 counter does not have a count greater than zero, the program is shifted to step 534 (FIG. 9B) whereat an evaluation of whether the DEGRADED 2 counter is equal to zero. If the DEGRADED 2 counter is equal to zero, the system is shifted to step 536 wherein an evaluation is determined on whether the circuitry associated with the draft command mechanism 85 has failed. If the circuitry associated with the draft force command mechanism 85 has tailed, the system is shifted to step 538. If the circuitry associated with the draft force command mechanism 85 has not tailed, the system is shifted to step 537 whereat the DEGRADED 2 mode of operation is cleared after which the program proceeds to step 538. However, if the DEGRADED 2 counter is not equal to zero, the system is shifted to step 538.

Returning to FIG. 9A, if the DEGRADED 2 software counter is full, step 528 directs the program into the DEGRADED 2 mode at step 539. Thereafter, the indicator light 106 is set ON at step 540 to alert the operator to an error and the alphanumeric display 102 on the indicator assembly is set to provide a visual indication of the DEGRADED 2 failure at step 541. At step 542, the failure is set to be written to the EEPROM 58 and then the program shifts to step 538.

Returning to FIG. 9B, step 538 is the first step in an evaluation of a LIMP error condition for the hitch assembly 20. If the program detects that the hitch assembly is operable in a LIMP condition, where the POSITION, DRAFT, and HITCH UP states (described in detail below) for the hitch assembly 20 are disabled. The remote switches 64, 65 or the up/down switch assembly 90 in the tractor are, however, operable. Moving the switch assembly 90 into a DOWN M position, will cause timed movement of hitch assembly downwardly. Toggling of the switch assembly 90 between UP and DOWN positions will allow for timed movement of the hitch assembly in an upward direction. Whereas, if the remote switches 64, 65 are being used to elevationally position the hitch assembly 20, movement of the hitch assembly will continue only as long as the appropriate switch is held by the operator. The type of errors which are detected in step 400 and which constitute a LIMP condition for the hitch assembly involve failure of the circuitry associated with the hitch position command mechanism 66, or, the circuitry associated with the hitch position sensor 78. Loss of the constant voltage regulator or battery voltage less than a minimum voltage (e.g. 9.8 volts) will likewise shift the program into a LIMP condition. Other faulty conditions for the hitch assembly will likewise shift the control unit into a LIMP condition.

Figure 10:
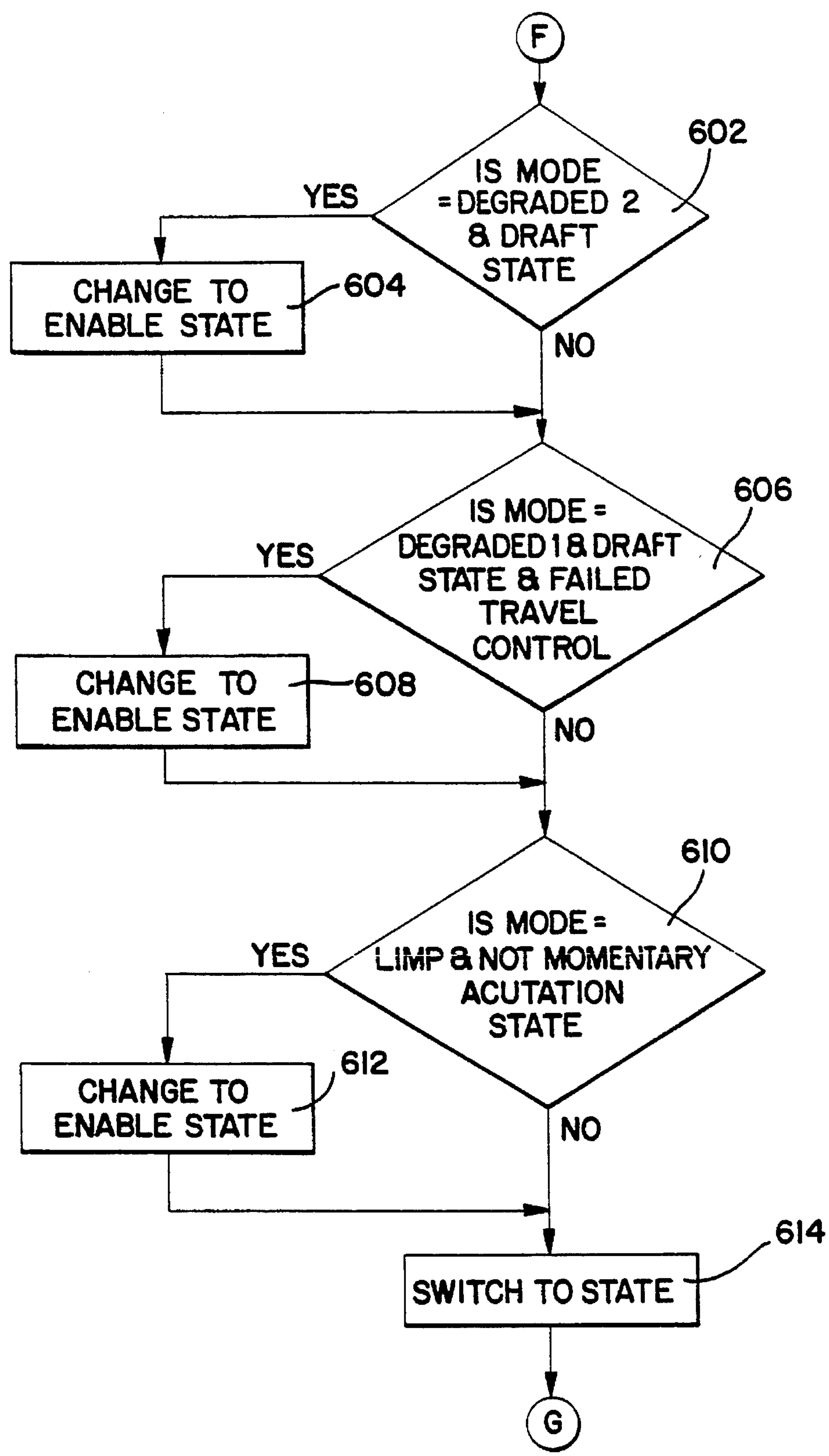

If a LIMP type error is detected at step 538, a LIMP software counter is incremented at step 543. At step 544 an evaluation is made whether the LIMP counter is full. As will be appreciated, the numerical count which constitutes a "full" LIMP counter is less than that numerical count used to shift the control system for the hitch assembly into a DEGRADED 2 or a DEGRADED 1 mode. If the LIMP counter is not lull, the program is shifted to step 602 (FIG. 10).

If at step 538 no LIMP type error is detected, the program advances to step 545. At step 545 an evaluation is made of whether the count in the LIMP counter is greater than zero. If the count in the LIMP counter is not greater than zero, the program is shifted into step 602 to determine the state of operation for the hitch assembly 20. If the count in the LIMP counter is greater than zero, the program for the control unit 42 shifts to step 546 whereat an evaluation is made on whether the hitch assembly is operable in a LIMP mode.

If a determination is made at step 546 that the hitch assembly is not operable in a LIMP mode, the program shifts to step 602 whereat the appropriate mode of operation is determined. If the determination at step 546 is that the hitch assembly is operated in a LIMP mode, the program shifts to step 548 whereat a determination is made on whether the LIMP error was caused by a failure of battery 18. If the error which caused the program to shift into a LIMP mode was not caused by a failure of battery 18, the program is shifted into step 602 to determine the appropriate state of operation. If the error which shifted the system into a LIMP mode was caused by battery failure only, step 548 directs the program to decrement the LIMP counter at step 550.

After the LIMP counter has been decremented, at step 552 the count in the LIMP counter is again evaluated. If the count in the LIMP counter is not equal to zero, the program is shifted to determine the appropriate state of operation at step 602. On the other hand, if the count in the LIMP counter is equal to zero, the program is shifted into step 554 which erases the LIMP mode and shifts the program into step 602 to determine the state of operation. As will be appreciated, the LIMP mode is erasable only upon correction of battery failure.

Returning to step 544, if the LIMP counter is full, the program shifts to step 556 wherein the hitch assembly is set to operate in a LIMP mode. After setting the hitch assembly to operate in a LIMP mode at step 558, the indicator lamp 106 is set to ON to alert the operator to a failure condition in the program or system. At step 560, the alphanumeric display 102 on the indicator assembly 100 provides a visual indication of the error causing the hitch assembly to operate in a LIMP mode. At step 562, the error is set to be written to the EEPROM 58 and then the program shifts to step 602.

As a result of the steps involved in the error evaluation step 500 (FIG. 6), a continuous evaluation of the hitch assembly operativeness is provided approximately every 10 milliseconds. After evaluating whether there are errors and categorization of the errors as either DEGRADED 1 or DEGRADED 2 or LIMP, the program proceeds to step 600. At step 600, the program determines the mode and state of operation for the hitch assembly 20. In the preferred embodiment, the hitch assembly is operable in any one of a plurality of states including: ENABLE; POSITION; DRAFT; HITCH UP; and MOMENTARY ACTUATION.

The ENABLE state is set for the hitch assembly when the following conditions exist. The elevational position of the hitch assembly as sensed by the sensor 78 (FIG. 1) is not within a predetermined range of where the sensors had previously detected the hitch assembly to be during the initialization step 200 of the program. An ENABLE state is appropriate when the elevational position of the hitch assembly as sensed by the sensor 78 is not within a predetermined range of the upper limit setting immediately after the initialization step 200 has been completed and the up/down switch assembly is positioned UP. In those hitch assemblies so equipped, the program is shifted to an ENABLE state when there is a transition between the remote switch assembly 63 being active and the remote switch assembly 63 being not active. After the initialization step has been completed, the program shifts to an ENABLE state. If hitch assembly is operating in a LIMP mode and the up/down switch assembly 90 is toggled, the program shifts to an ENABLE state upon return of the switch assembly 90 to a DOWN position. In the preferred embodiment, and upon starting of the tractor or after actuation of the tractor, the system must shift to an ENABLE state before hitch actuation can be accomplished. To operate the remote switch assembly 63, however, the system need not be in an ENABLE state. The conditions schematically illustrated in steps 602,606 and 610 (FIG. 10) likewise cause a transition to the ENABLE state.

In the POSITION state, the hitch assembly 20 is commanded only by the hitch command mechanism 66. In this state, the hitch assembly 20 will elevationally move until the actual hitch position is within a predetermined range of the setting for the operator controlled mechanism 68 of the hitch command mechanism 66.

In the DRAFT state, the hitch assembly 20 is commanded to maintain a substantially constant draft and toward this end is permitted to elevationally move within predetermined limits.

In a HITCH UP state, the hitch assembly is commanded under the influence of the up/down switch assembly 90. The hitch assembly 20 will move upwardly when the switch assembly 90 is set in an UP position. In this state, the hitch assembly will be permitted to move up to the upper limit set by the upper limit knob 94 or to the maximum upper limit of the hitch assembly if knob 94 does not exist.

In a MOMENTARY ACTUATION state, the hitch assembly 20 is commanded to move under the influence of the remote switch assembly 63 or the up/down switch assembly 90 in LIMP mode. Notably, the hitch assembly 20 will continually move either up or down at a constant rate under the influence of the remote switch assembly 63 whereas the hitch assembly 20 will move at a constant rate for predetermined segmented periods of time (approximating 2 seconds each) when operating in a LIMP mode and under the influence of the switch assembly 90.

The steps involved with step 600 are schematically represented in FIG. 10. Determination of which state is suited for the hitch assembly 20 begins at step 602. At step 602, an evaluation is made whether DEGRADED 2 was activated during step 500 and whether the program has been operating in a DRAFT state setting. If DEGRADED 2 was activated during step 500 and the hitch assembly was operating in a DRAFT state, the program is shifted to step 604 which conditions the program to operate the hitch assembly 20 in an ENABLE state. If conditions for step 602 are not satisfied, the program is shifted to step 606. Notably after the program has shifted to an ENABLE state at step 604, the program is directed to step 606.

At step 606, an evaluation is made whether DEGRADED 1 mode was activated during step 500 and whether the hitch assembly was operating in a DRAFT state and whether the electric circuitry or any other aspect associated with the travel apparatus 96 has failed. If a DEGRADED 1 was activated during step 500 and the hitch assembly was operating in a DRAFT state and if any aspect of the travel apparatus is faulty, step 606 directs the program to step 608 which conditions the hitch assembly into an ENABLE state of operation. On the other hand, if conditions of step 606 are not met, the program shifts to step 610. Notably, after the program has shifted to an ENABLE state at step 608, the program is directed to step 610.

At step 610, an evaluation is made whether the LIMP mode was activated in step 500 and whether the remote switches 64, 65 for vertically moving the hitch assembly are currently not being operated. If the LIMP mode was activated during step 500 and the remote switches 64, 65 are not being used to vertically move the hitch assembly, the program is shifted to step 612 which also conditions the hitch assembly into an ENABLE state. If conditions of step 610 are not met, the program is shifted to step 614 which allows the hitch assembly to operate in the same state to which it was conditioned prior to step 600. Notably, after the program has shifted to an ENABLE state at step 612, the program will shift to step 614.

Various operator settings sensed during operation of the hitch assembly 20 permits the program of the control unit 42 to identify the particular state of operation for the hitch assembly 20 and the control objectives. FIGS. 11A through 11E schematically represent transition diagrams which allow the state of operation of the hitch assembly to switch or change from one state to another state depending upon the particular sensed settings for the hitch assembly 20.

FIG. 11A schematically illustrates those steps which will allow the program for the hitch assembly to switch or transition from an ENABLE state to either: a HITCH UP state; a POSITION state; a MOMENTARY ACTUATION state; or remain in an ENABLE state. As shown in FIG. 11A, the first step 702 in tile transition process from an ENABLE state involves determining whether the tractor 10 is stopped and whether either of the remote switches 64, 65 is being operated. If the ground speed sensor 88 indicates that the tractor 10 is stopped and either of the remote switches 64 or 65 is being actuated, the program then shifts to step 704 which changes the state of operation for the hitch assembly into the MOMENTARY ACTUATION state upon the next timed loop or cycle of the program. On the other hand, if the conditions of step 702 are not met, the program is directed to step 706.

At step 706 an evaluation is made whether the tractor 10 is stopped and either the switch assembly 90 is toggled between UP and DOWN or positioned DOWN M to elevationally position the hitch assembly 20 and whether the LIMP mode was activated. If all the conditions evaluated at step 706 are satisfied, the program shifts to step 704 such that the state of operation for the hitch assembly shifts to the MOMENTARY ACTUATION state upon the next timed loop of the program. If the conditions of step 706 are not satisfied, the program of the control unit is shifted to step 708.

At step 708, evaluations are made whether the up/down switch assembly 90 is in an UP position and a software hitch enable flag, to be set in step 716, indicates whether the upper limit assembly 94 is set to be within a predetermined range of the elevation of the hitch assembly draft links 28 so as to enable tile hitch assembly. If the evaluations at step 708 are satisfied, the program shifts to step 710 such that the state of operation for the hitch assembly shifts or transitions to the HITCH UP state of operation upon the next timed loop of the program. If the evaluations considered at step 708 are not satisfied, the program shifts to step 712.

At step 712, evaluations are made whether the up/down switch assembly 90 is DOWN and whether the adjustable mechanism 68 associated with the operator command mechanism 66 is set to be within a predetermined range of the elevation of the hitch assembly draft links 28 so as to enable the hitch assembly 20. If the conditions analyzed at step 712 are satisfied, the program shifts to step 714 so that the state of operation of the hitch assembly shifts or transitions to a POSITION state upon the next timed loop of the program. If the conditions analyzed at step 712 are not satisfied, the program shifts to step 16.

At step 716, an evaluation is made whether the hitch assembly is enabled. For details concerning the algorithm associated with step 716, the reader is kindly referred to the computer program listing contained in the appendix attached hereto and forming part hereof. If it is determined that the hitch assembly 20 is enabled, a software hitch enable flag, which was initialized in step 266 (FIG. 7C), will be set. If the hitch enable flag is set, upon the next timed loop, the program will be shifted to either step 710 or 714 to shift the program to either a HITCH UP state or a POSITION state depending upon the position of the switch assembly 90.

Step 720 of the program conditions the indicator light 106 into a FLASHING mode if there is no LIMP failure. The FLASHING mode of the indicator light 106 provides a visual indication that the system is not enabled and the operator is required to positively act before the hitch assembly could be elevationally moved.

FIG. 1 1B schematically illustrates those steps which will allow the program for the hitch assembly to switch or transition from a POSITION state to either: a HITCH UP state; a MOMENTARY ACTUATION state; or to a DRAFT state. As schematically POSITION state involves a determination of whether the up/down switch assembly 90 is positioned in an UP position. If the switch assembly 90 is positioned in an UP position, the program shifts to step 724 which changes or shifts the state of operation for the hitch assembly to the HITCH UP state upon the next timed loop of the program. Alternatively, if the switch assembly 90 is not positioned in the UP position, step 722 directs the program to step 726.

At step 726, an evaluation is made whether the tractor 10 is stopped and whether either of the remote switches 64, 65 are actuated. If the tractor 10 is stopped and either of the remote switches 64, 65 are actuated, the program shifts to step 728 such that the state of operation for the hitch assembly shifts or transitions to a MOMENTARY ACTUATION state of operation upon the next timed loop of the program. If the evaluations considered at step 726 are not satisfied, the program shifts to step 730.

At step 730, an evaluation is made whether the tractor 10 is moving as detected by the sensor 88 and that the DEGRADED 2 mode was not activated in step 500 and that a DRAFT state of operation is configured on the tractor. If the conditions evaluated at step 730 are satisfied, the program is directed to step 732. If each of the conditions evaluated at step 730 are not satisfied, the program is directed to step 734. At step 734, the program directs the indicator lamp 106 to be OFF if there have been no failures of the system.

From step 734, the program is directed to step 736. At step 736, the program directs the control unit 42 to maintain the elevational position of the hitch assembly 20 equal to the position set for the hitch assembly as a function of the position of the adjustable mechanism 68 of the hitch command mechanism 66. For details concerning the algorithm associated with step 736, the reader is kindly referred to the computer program listing contained in the appendix attached hereto and forming part hereof.

Returning to step 732, an evaluation is made whether the draft load as sensed by the draft load sensor assembly 80 is greater than the draft load set by the operator on the draft force command mechanism 85 as measured by the potentiometer 86 (FIG. 4). In a preferred embodiment of the invention, step 732 further analyzes whether the draft force sensed by the sensor assembly 80 is greater than that sensed by the command mechanism 85 for a specified period of time which, in the illustrated embodiment, is greater than 0.1 seconds. If the conditions analyzed in step 732 are satisfied, the program shifts to step 738 such that the state of operation of the hitch assembly transitions from the POSITION state of operation to the DRAFT state of operation upon the next timed loop of the program. On the other hand, if the conditions analyzed in step 732 are not satisfied, that is, the draft load as sensed by the draft load sensor assembly 80 does not exceed the setting of the draft force command mechanism 85 for the specified period of time, the program shifts from step 732 to step 734 and the program proceeds as discussed above without changing the POSITION state operation.

Figure 11C:
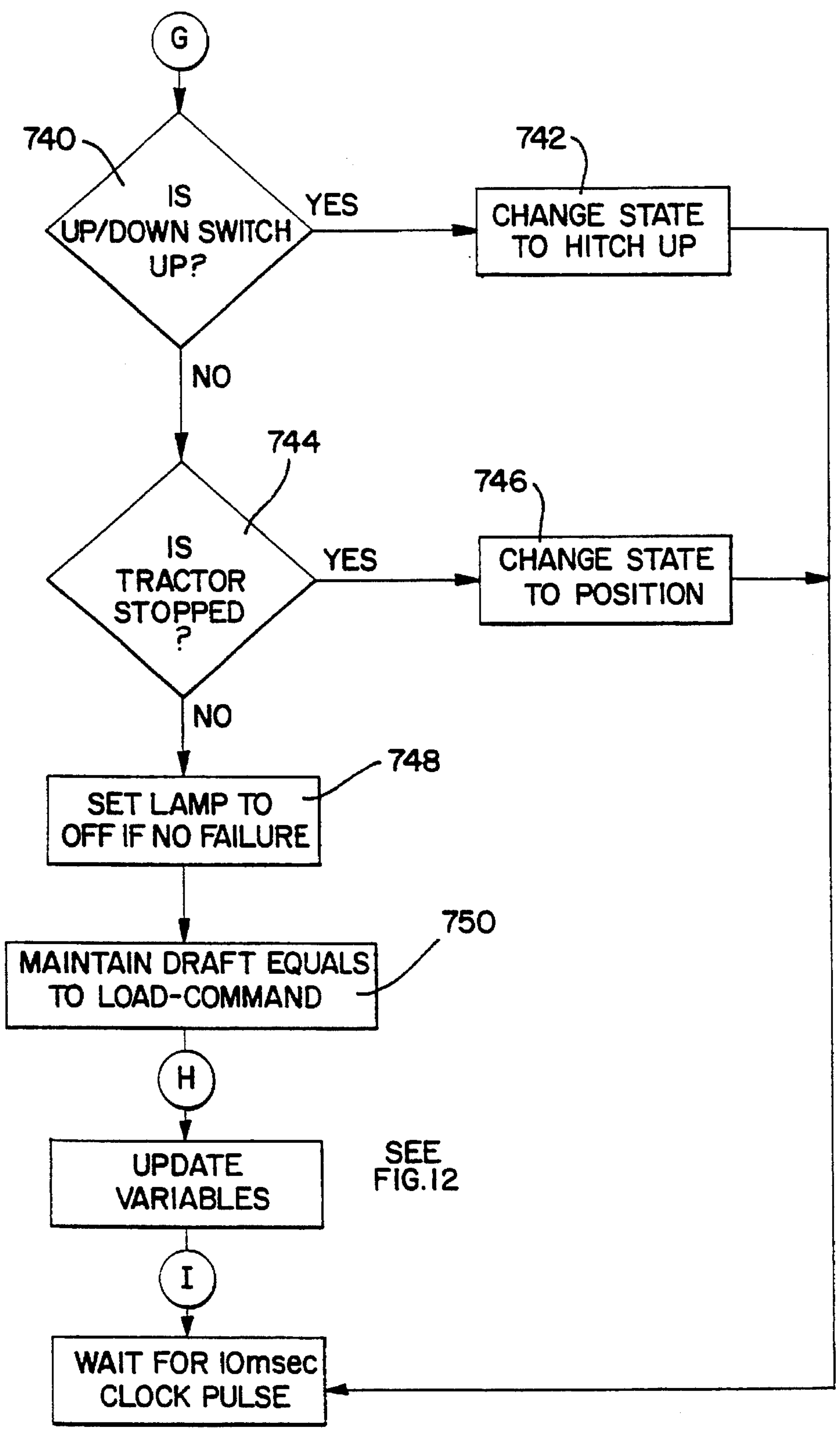

FIG. 11C schematically illustrates those steps which allow the program for the hitch assembly to switch or transition from the DRAFT state to either: the HITCH UP state; or the POSITION state. As schematically represented in FIG. 11C, the initial step 740 in the transition process from the DRAFT state involves a determination of whether the up/down switch assembly is positioned UP. If the switch assembly 90 is positioned UP, the program shifts to step 742 such that the state of operation for the hitch assembly shifts or transitions to the HITCH UP state upon the next timed loop of the program. On the other hand, if the up/down switch assembly 90 is not positioned UP, the program is directed to step 744.

At step 744, an evaluation is made of whether the tractor 10 is stopped. If the ground speed sensor 88 or other suitable device provides a signal indicating that tractor 10 is stopped, the program shifts to step 746 such that the state of operation for the hitch assembly shifts or changes to the POSITION state of operation. If the tractor is not stopped, however, the program immediately shifts to step 748 and the hitch assembly remains in the DRAFT state of operation during the consecutive timed loop of the program.

At step 748, the program directs the indicator light to be OFF if there have been no failures. With the indicator light OFF, the operator is provided with a visual indication that the system remains operational to elevationally position the hitch assembly. From step 748, the program is directed to step 750.

A salient feature of the present invention concerns the ability of the control unit 42 to maintain a substantially constant load on the hitch assembly 20 during operation of the implement attached to the hitch assembly 20. Effecting such ends is accomplished during the DRAFT state at step 750. At step 750, the program operates under a separate control algorithm the operation of which is discussed in further detail below (see FIG. 13). For more details concerning the control algorithm used at step 750 during the DRAFT state, the reader is kindly directed to the computer program listing contained in the appendix attached hereto and forming a part hereof.

Figure 11D:
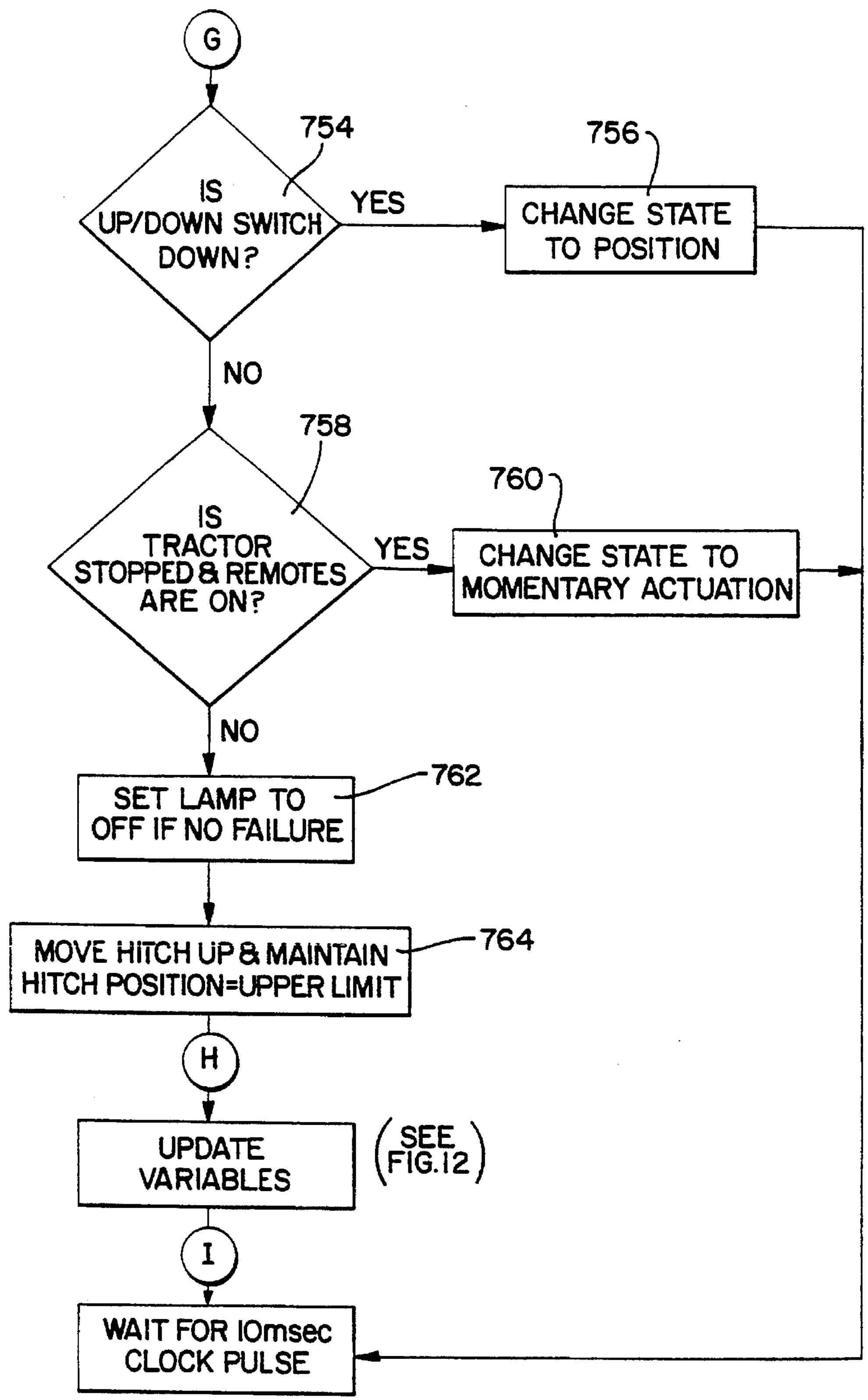

FIG. 11D schematically illustrates those steps which will allow the program for the hitch assembly to switch or transition from a HITCH UP state to either: a POSITION state of operation; or a MOMENTARY ACTUATION state of operation. As schematically represented in FIG. 11D, the initial step 754 in the transition process from the HITCH UP state of operation involves a determination of the position of the up/down switch assembly 90. If the switch assembly 90 is positioned DOWN, the program shifts from step 754 to step 756. Step 756 permits the state of operation of the hitch assembly to shift from the HITCH UP state to the POSITION state upon the next timed loop of the program. On the other hand, if the switch assembly 90 is positioned UP, step 754 directs the program to step 758.

At step 758, an evaluation is made whether the tractor is stopped and whether either of the remote switches 64, 65 are being used to elevationally position the hitch assembly. If the tractor is stopped and either of the remote switches are being used, the program shifts to step 760 such that the state of operation for the hitch assembly shifts or transitions to the MOMENTARY ACTUATION state upon the next timed loop of the program. If the conditions analyzed in step 758 are not satisfied, the program shifts to step 762 and the hitch assembly remains in the HITCH UP state of operation upon the next timed loop of the program.

At step 762, the program directs the indicator light to be turned OFF if there have been no failures. Turning the indicator light 106 OFF provides a visual indication to the operator that the hitch assembly is operating without failure. From step 762, the program shifts to step 764.

At step 764, the program of the control unit 42 causes the hitch assembly to vertically move upwardly. The upward vertical movement of the hitch assembly continues until the hitch reaches the upper limit of its travel. The upper limit of hitch movement can either be determined from the configuration of the hitch assembly or by the operator selected setting of the upper limit knob or apparatus 94 (FIG. 4). After the hitch assembly reaches the upper limit of its travel, the program maintains the hitch assembly in the upper limit position for transportation purposes and the like.

Figure 11E:
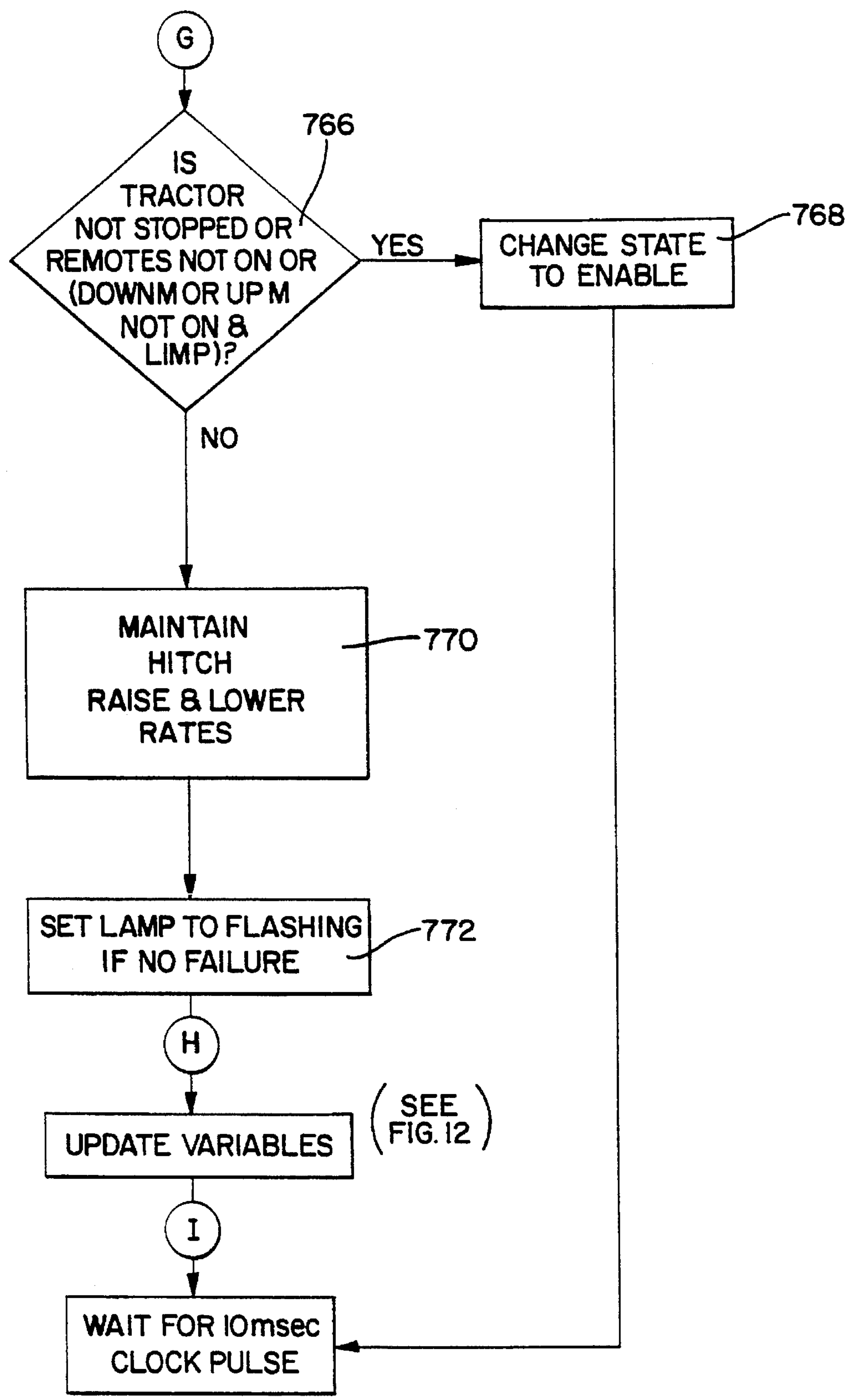

FIG. 11E schematically represents those steps which will allow the program for the hitch assembly to switch or transition form a MOMENTARY ACTUATION state to an ENABLE state. As schematically illustrated in FIG. 11E, the initial step 766 in the transition process from the MOMENTARY UP state involves a determination of whether the tractor 10 is stopped or whether either of the remote switches 64, 65 are being used to elevationally position the hitch assembly or the switch assembly is not toggled between UP and DOWN and is not positioned DOWN M and the hitch assembly is not in a LIMP mode. If the conditions evaluated at step 766 are satisfied, the program shifts to step 768 so that the state of operation of the hitch assembly shifts or transitions to the ENABLE state of operation upon the next timed loop of the program.

On the other hand, if the conditions specified in step 766 are not satisfied, the program shifts to step 770 whereat an algorithm for elevationally moving the hitch assembly at a constant rate is executed or implemented. For more details concerning the algorithm associated with step 770, the reader is kindly referred to the computer program listing contained in the appendix attached hereto and forming a part hereof.

At step 772, the program directs the indicator lamp 106 into a FLASHING mode if there have been no failures. The FLASHING mode of the indicator lamp 106 provides a visual indication to the operator that the system is not enabled and the operator is required to positively act before the hitch assembly will elevationally move.

Figure 12:
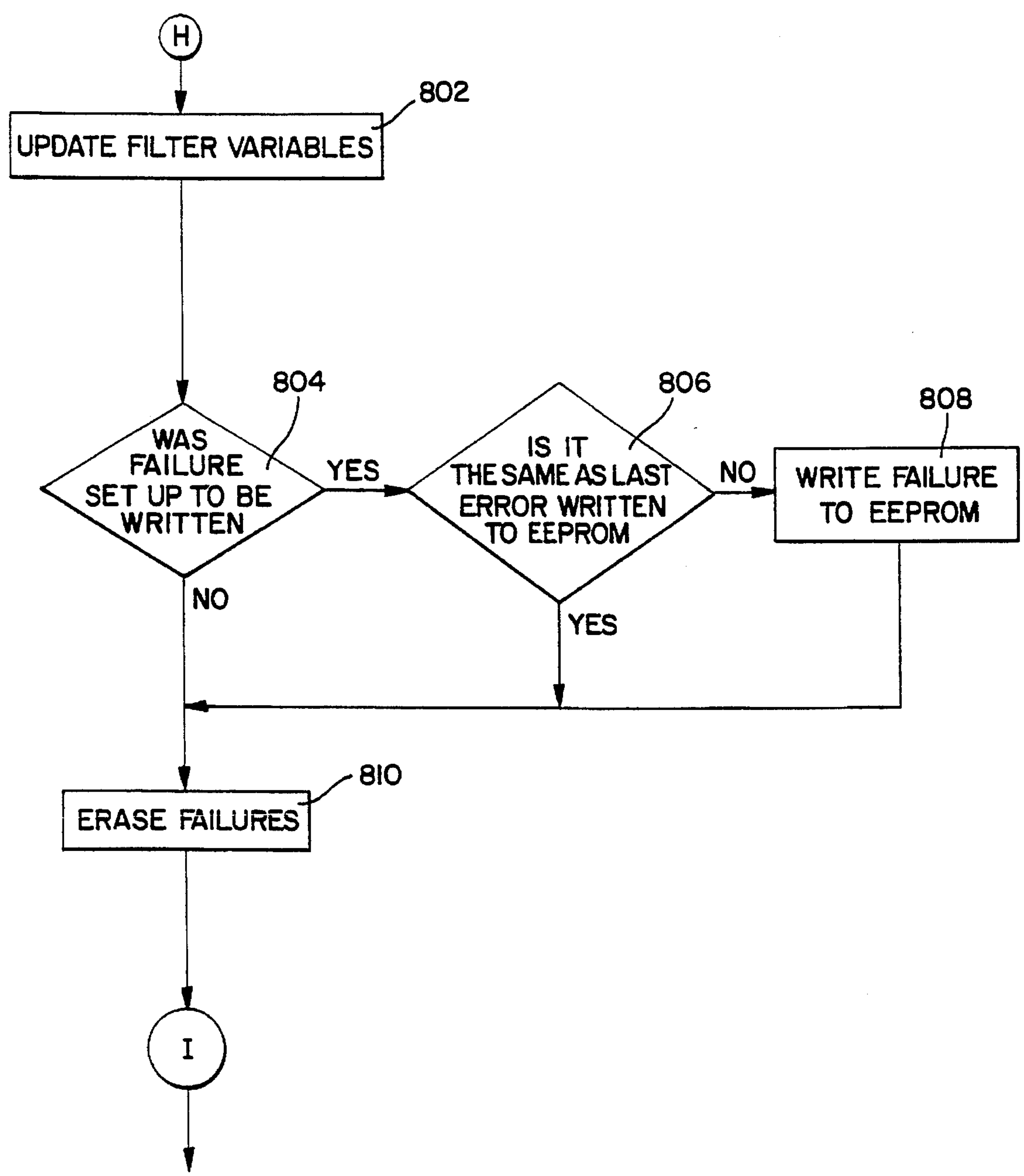

FIG. 12 schematically illustrates the final process involved in a complete timed loop of the program for the hitch assembly. As was discussed in detail above, during each timed loop of the program, the control unit is passed through a series of steps to determine and identify the particular state of operation for the hitch assembly 20 and to effect the desired control objectives. In the illustrated embodiment, and so as to update the variables associated with the hitch assembly prior to commencement of a subsequent timed loop or cycle, after the program is shifted or transitioned to the appropriate state for hitch assembly operation and before the expiration of the timed loop cycle, the program is passed through steps 802 through 810.

Step 802 involves updating variables such as hitch position and the setting for the operator command mechanism 66. These variables are used in filtering algorithms of the program for which past data needs to be updated. In step 804, an evaluation is made as to the existence of failures in the system that are set to be written to the EEPROM 58 (see for example step 524 or step 542 in FIGS. 9A, and step 562 in FIG. 9B). If a failure set to be written exists, the program is shifted to step 806.

At step 806, the failure is checked against the last failure written to the EEPROM 58. If the failure was not written as a last failure, the failure is written into the EEPROM 58 at step 808. Thereafter, the program is shifted to step 810. On the other hand, if the failure is the same as the last failure written to the EEPROM 58, the program is shifted to step 810. Notably, if the evaluation at step 804 determines that there are no failures to be written in the system, the program shifts to step 810.

At step 810, the failures that were detected during the previous timed loop or cycle are erased so that if they continue to exist they can be detected and counted in the next timed loop or cycle of the program. From step 810, the program transitions into a loop awaiting to be interrupted by the clock pulse which shifts and returns the program to step 300 (FIG. 6) for commencement of the next timed loop or cycle.

Figure 13:
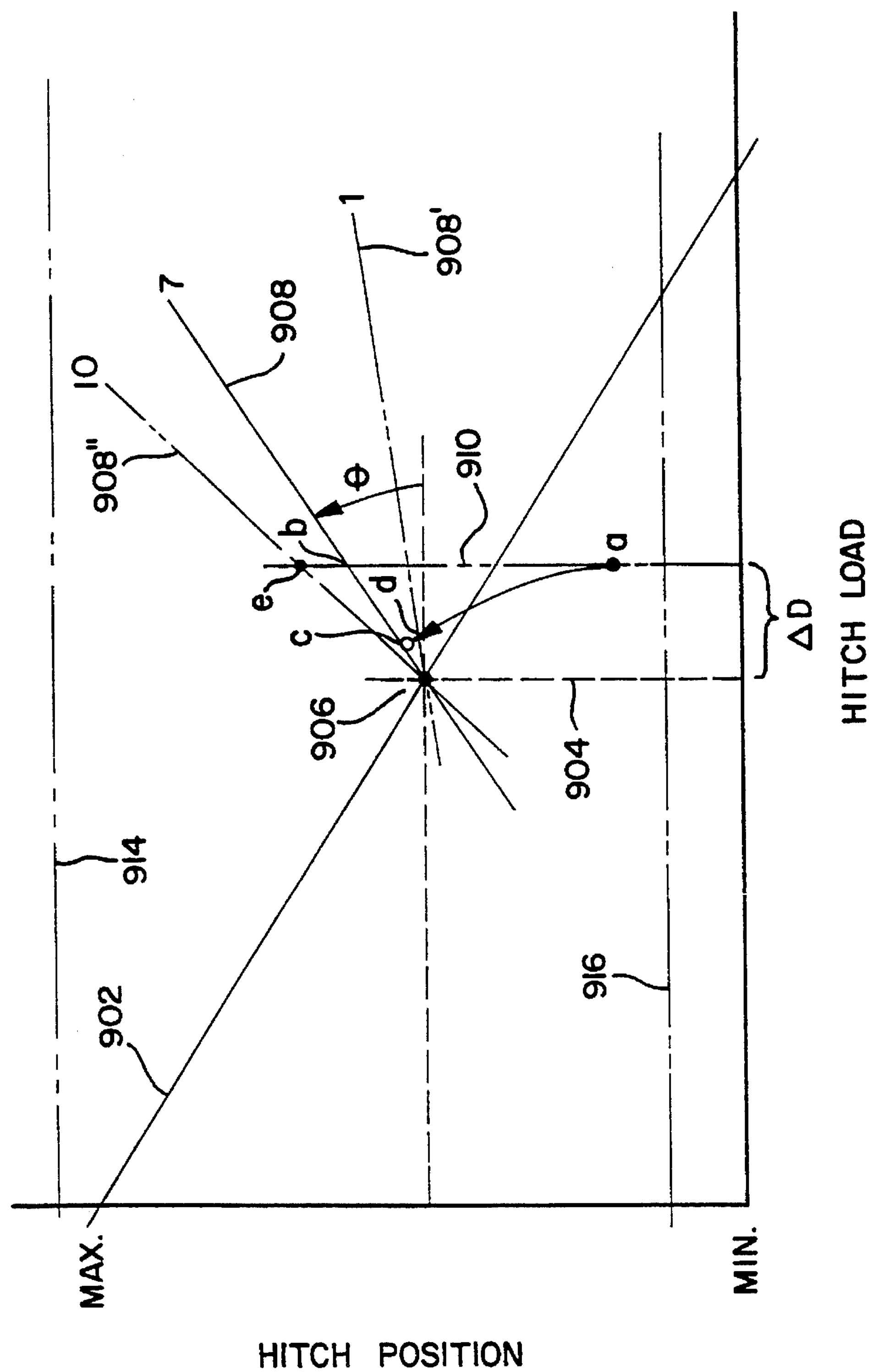
FIG. 13 is a graphic illustration of operation of the control system during a particular hitch assembly state of operation known as "DRAFT" state.

A salient feature of the present invention concerns operation of the hitch assembly in a DRAFT state. A schematic representation of hitch assembly operation in the DRAFT state is provided in FIG. 13. As shown in FIG. 13, line 902 represents a load-line which schematically relates the elevational position of the hitch assembly 20 to the draft force or load applied to the hitch assembly 20. Line 904 schematically represents the setting of the draft force command mechanism 85 as selected by the operator. As will be appreciated, the location 906 where the draft force setting selected by the operator intersects the load line 902 is functionally related to the elevational position or depth of the hitch assembly. Line 908 schematically represents the setting selected by the operator for the travel knob or apparatus 96. Notably, apparatus 96 is adjustable through a range of positions or settings. Each setting on tile travel knob 96 provides a different slope or angle θ to line 908. As an example, a setting of "1" on the travel knob 96 will provide a different slant to the line as shown by line 908' than will a setting of "10" as shown by line 908". Line 910 on FIG. 13 indicates an actual draft load being placed on tile hitch assembly as measured by sensors 82, 84.

In a DRAFT state, and in the example being used for purposes of this description, the control unit 42 will detect that there is a difference between the actual draft force or load being applied to the hitch assembly 20 as detected by the sensors 82, 84 and the desired draft force or load as set by the draft force command mechanism 85. The control unit 42, therefore, will control the actuator 30 to move the hitch assembly 20 to seek an equilibrium. In the example illustrated in FIG. 13, the control unit 42 will cause the actuator 30 to elevate the hitch assembly 20 from a point "a" until the draft force intersects with the line 908 representative of the setting for the travel knob 96 at point "b", assuming that the difference between the actual draft load or force applied to the hitch assembly as a result of ground/implement interaction and the setting of the travel assembly 96 would not change or vary. Theoretically, if the draft load did not change as a function of the position or penetration of the implement in the ground, the position of the hitch assembly would move linearly from point "a" to point "b". As will be appreciated by those skilled in the art, however, as the hitch assembly rises under the influence of the actuator 30, the actual draft load applied to the hitch assembly will decrease and, thus, the ultimate load placed on the hitch assembly will be closer to the point "c". As will be appreciated, if the travel knob 96 were set to "1" as illustrated by line 908", the actuator 30 would be operated until the hitch position, as indicated by sensor assembly 78, intersects line 908' at point "d". Similarly, if the travel knob 96 were set to "10", and the draft load were not a function of the implement penetration in the ground, the actuator 30 would be operated until the hitch position intersected with line 908" at point "e". A unique feature of the present invention is the ability to independently adjust the travel of the hitch assembly during the DRAFT state to achieve those results most beneficial for the operator.

Another unique advantage of the present invention concerns the provision of the response assembly 98. As mentioned above, the purpose of the response assembly 98 is to control the response rate over which the hitch assembly vertically moves during operation of the implement attached to the hitch assembly. In the example illustrated in FIG. 13, the response rate concerns the amount of time over which the hitch assembly will rise as it vertically moves between points "a" and "c". As will be appreciated by those skilled in the art, the ability to independently control the response time of the hitch assembly provides the operator with a smoother ride and avoids overloading of the tractor engine as the vertical position of the hitch assembly changes from one depth to another.

As mentioned above, the control system of the present invention permits the hitch assembly 20 to operate between upper and lower limits. The upper limit of hitch assembly is schematically illustrated in FIG. 13 by line 914. The lower limit of hitch assembly operation is schematically illustrated in FIG. 13 by line 916. Setting the upper limit inhibits damage to the tractor when the hitch assembly is raised to its extreme upper position. An advantage of the present invention is that during a DRAFT state, the control system of the present invention will control the actuator 30 in a manner preventing the hitch assembly from going beneath the lower limit represented by line 916.

Turning now to FIG. 14, the sequence of steps included in a typical calibration of control system 40 will now be described. The steps discussed in detail below are generally included the calibration process represented at step 286 in FIG. 7D. This calibration process is preferably performed with tractor 10 in a stationary condition and with no load on hitch assembly 20. In addition, prior to calibration the signal generated by position signal device 70 with lever 68 at its upper-most position is preferably set to a predetermined level, such as 4.85 volts ±0.1 volt. Similarly, the signal generated by the position sensor 78 with hitch assembly 20 at its lower-most position is preferably set to a predetermined level, such as 0.9 volts ±0.1 volt. This precalibration procedure may be shortened or avoided by implementation of an automatic precalibration sequence.

The beginning of the calibration process is represented in FIG. 14 by step 1000. Following step 1000, control system 40 measures the voltage of battery 18. In the present embodiment, this measurement of the voltage of battery 18 is performed by a resistance voltage divider arrangement (not shown) of generally known construction, and is based upon the voltage supplied to control unit 42, which is also used to power microprocessor 60 via a voltage regulator. This arrangement is configured to generate an analog signal proportional to the voltage across the terminals of battery 18. Microprocessor 60 is in turn configured to convert this analog signal to a digital value Veal and to store this value in RAM 56 for later use in adjusting control signals generated by control system 40 as will be discussed below.

At step 1004 microprocessor 60 recognizes the presence of upper limit command assembly 94, 95. In the present embodiment the presence of this upper limit command assembly 94.95 is signaled or acknowledged by an operator in response to an operator prompt on indicator assembly 100 by depressing switch 90 in the DOWN M position. At step 1006, microprocessor 60 similarly tests for the presence of draft sensors 82, 84, travel sensor 97, response sensor 99 and draft command sensor 86. If these elements are not found, system 40 assumes tractor 10 is not equipped with a DRAFT state control. If only one draft sensor is found by the system, an operator is prompted to input whether tractor 10 is equipped with one or two draft sensors, and calibration continues accordingly (assuming loss of one sensor in the event that two sensors are present but only one is identified). Based upon the results of steps 1004 and 1006, microprocessor 60 generates a value representative of the system configuration, Config. In the present embodiment, this value may indicate either that the system is configured for DRAFT state control, or DRAFT state control with a number of draft sensors other than two. Microprocessor 60 is configured to store this value in RAM 56. Other system configurations could of course be provided.

At step 1008 the operator is prompted to lower hitch assembly 20. Step 1008 is shown in broken lines in FIG. 14 because, while it is preferable to lower the hitch for the subsequent calibration steps, this is not essential and calibration can continue from any position of hitch assembly 20 which is sufficiently distant from the upper-most position to allow the hitch assembly 20 to be raised slightly during the raise threshold sequence at step 1014 as will be described. Before proceeding to step 1010, microprocessor 60 receives the position signal generated by position sensor 78, converts this signal to a digital value, and stores this digital value in RAM 56 for later use in the threshold determining sequence as will be described.

At step 1010 the operator is prompted to move position command lever 68 to its upper-most or maximum raise position. In the present embodiment, the operator is prompted to acknowledge when lever 68 is in the upper-most position by depressing switch 90 in the DOWN M position. At step 1012 microprocessor 60 receives the position command signal generated by signal device 70 when lever 68 is in the upper-most position through analog switch 48, converts this signal to a digital value Pos-com-max and stores this digital value in RAM 56 for later use in the calibration process as will be described below.

At step 1014 control system 40 enters into a sequence of steps for determining the minumum pulse width modulated current that can be supplied to raise coil 38 of valve 34 to cause upward movement of hitch assembly 20. This pulse width modulated current value is referred to as the raise threshold, or Traise. The steps performed by control system 40 in determining this current threshold will be discussed in detail below in reference to FIG. 14C.

At step 1016, once the pulse width modulated raise current threshold has been determined, microprocessor 60 sends a full pulse width signal to raise coil 38 causing hitch assembly 20 to be raised. This full pulse width raise signal may be of brief duration, typically of the order of a fraction of a second. At step 1018, during the time this raise signal is supplied to raise coil 38, a coil parameter signal is generated by a coil parameter measuring circuit 1100, as will be described in reference to FIG. 15, and applied to microprocessor 60. This coil parameter signal represents electrical characteristics of raise coil 38, and preferably represents the current through the coil, or a combination of the voltage of battery 18 and the resistance of coil 38 when energized with the full pulse width raise signal at step 1016. Microprocessor 60 is configured to convert this coil parameter signal to a digital value, Coilparamcal, and to store this digital value temporarily in RAM 56 for later use in adjusting control signals produced by control system 40, as will be described.

At step 1020, hitch assembly 20 is raised by energizing raise coil 38 and caused to contact an upper mechanical stop (not shown). At step 1022, with hitch assembly 20 in the upper-most position, the signal generated by position sensor 78 is received by microprocessor 60 through analog switch 48. Microprocessor 60 is configured to convert this position signal to a digital value. At step 1024, microprocessor 60 reduces this digital value, representative of the output of position sensor 78 when hitch assembly 20 is in contact with the upper mechanical stop, by a predetermined amount, typically corresponding to approximately 1 degree of angular displacement of hitch assembly 20, to determine an upper-most allowable hitch position. At step 1026, this reduced value, Pos-actual-max, is stored temporarily in RAM 56. As will be described, in the present embodiment the reduction of the upper-most position signal at step 1024 effectively results in limiting position command signals, for calibration and control purposes, to a level which will not cause hitch assembly 20 physically to contact the upper mechanical stop. This feature of the calibration and control configuration serves to avoid potential damage to hitch assembly 20 and any implement coupled to the assembly, and to prevent jolting to tractor 10 by impacting the mechanical stop.

At step 1028 the operator is prompted to move position command lever 68 to the lower-most position. In the present embodiment, the operator is prompted to acknowledge that lever 68 is in its lower-most position by depressing switch 90 in the DOWN M position. At step 1030, when lever 68 is in the lower-most position, control system 40 receives the signal generated by signal device 70 through analog switch 48. Microprocessor 60 is configured to convert this signal to a digital value, Pos-com-min, and to store this value in RAM 56.

At step 1032 control system 40 enters into a sequence of steps for determining the minumum current that can be supplied to lower coil 39 of valve 36 to cause downward movement of hitch assembly 20. This current value is referred to as the lower threshold, or Tlower. The steps performed by control system 40 in determining this current threshold will be discussed in detail below in reference to FIG. 14C.

At step 1034 control system 40 causes hitch assembly 20 to lower by applying current to the lower coil 39 of valve 36, until the assembly contracts a lower mechanical stop. In the present embodiment the operator is prompted to acknowledge that hitch assembly has reached the lower-most position by depressing switch 90 in the DOWN M position. This acknowledged position state of assembly 20 is represented at step 1036.

At step 1038, with hitch assembly 20 at the lower-most position, signals from draft sensors 82 and 84 are received by microprocessor 60. Digital values corresponding to these signals are stored in RAM 56 as Rpinoffset and Lpinoffset respectively. At step 1040 the position signal generated by position sensor 78 is received by microprocessor 60 through analog switch 48. Microprocessor 60 is configured to convert this signal to a digital value Pos-actual-min, and to store this value temporarily in RAM 56.

At step 1042 microprocessor 60 subtracts the value representative of the lower-most hitch position, Pos-actual-min, stored in RAM 56, from the value representative of the upper-most allowable hitch position, Pos-actual-max, also stored in RAM 56, to calculate the hitch position range, Posrange. At step 1044 microprocessor 60 generates a correlation factor, Poscorr, relating the position of command lever 68 to the hitch position range, Posrange. In the present embodiment, Poscorr is generated based upon the lower-most and upper-most positions of the command lever, Pos-com-min and Pos-com-max, and upon the hitch position range Posrange. This correlation factor is stored in RAM 56.

Step 1046 represents the end of the calibration sequence. At this point control system 40 proceeds to step 288 in FIG. 7D.

The raise threshold and lower threshold sequences, represented generally by steps 1014 and 1032, are substantially similar and will both be discussed by reference to FIG. 14C. Although in the following discussion reference will be made to the threshold generically, it should be understood that this threshold is either the raise threshold or the lower threshold depending upon which of steps 1014 or 1032 is being executed.

Figure 14A:
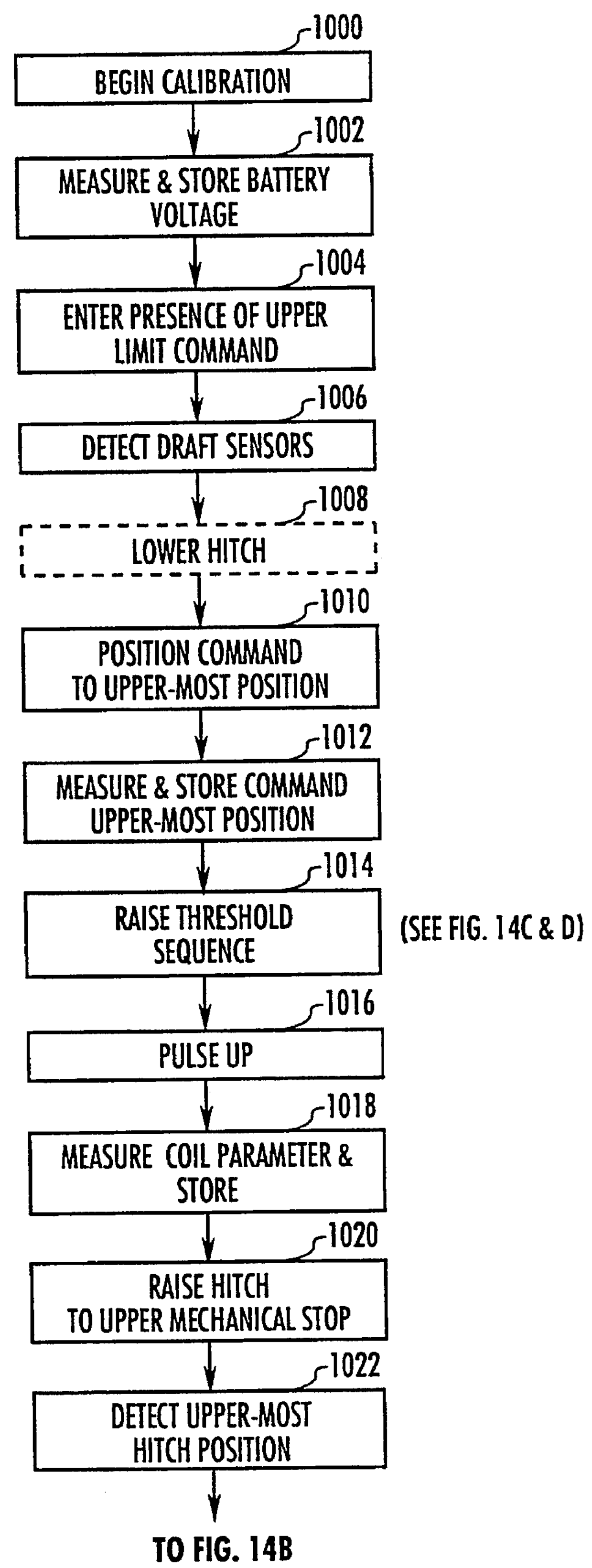
FIG. 14 is a flow chart schematically illustrating the various steps involved in a typical calibration sequence for the control system.
Figure 14B:
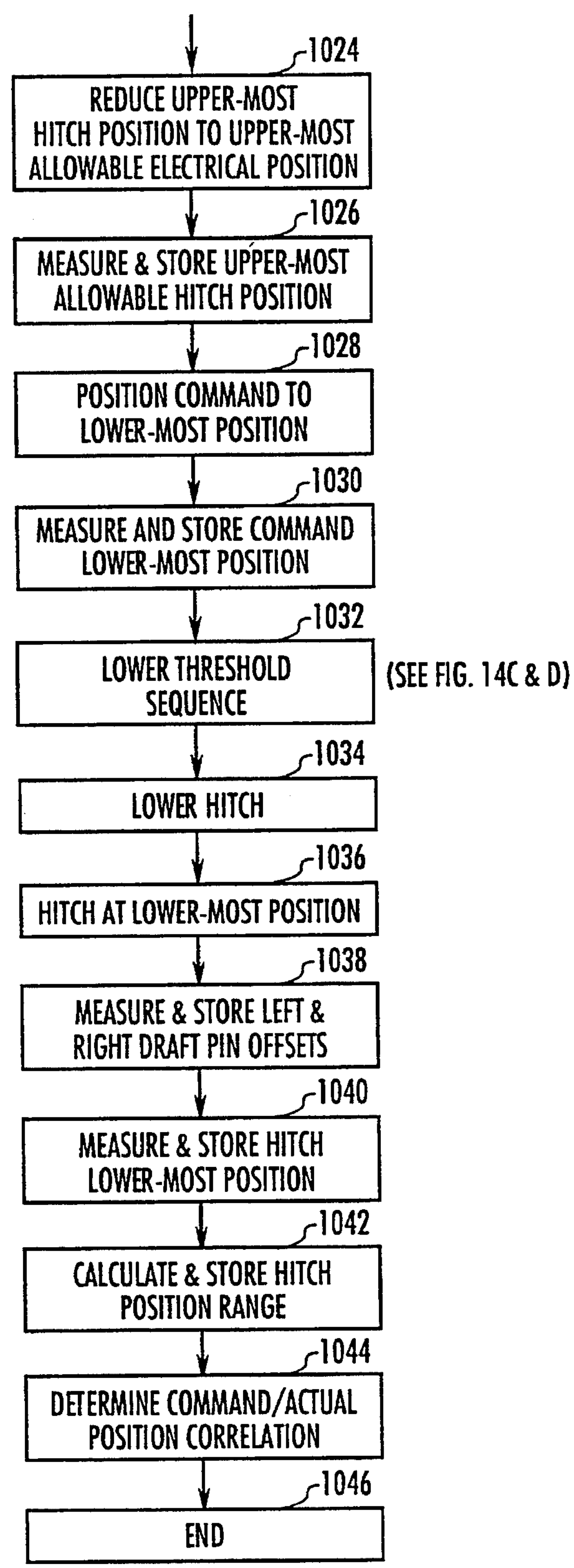
Figure 14C:
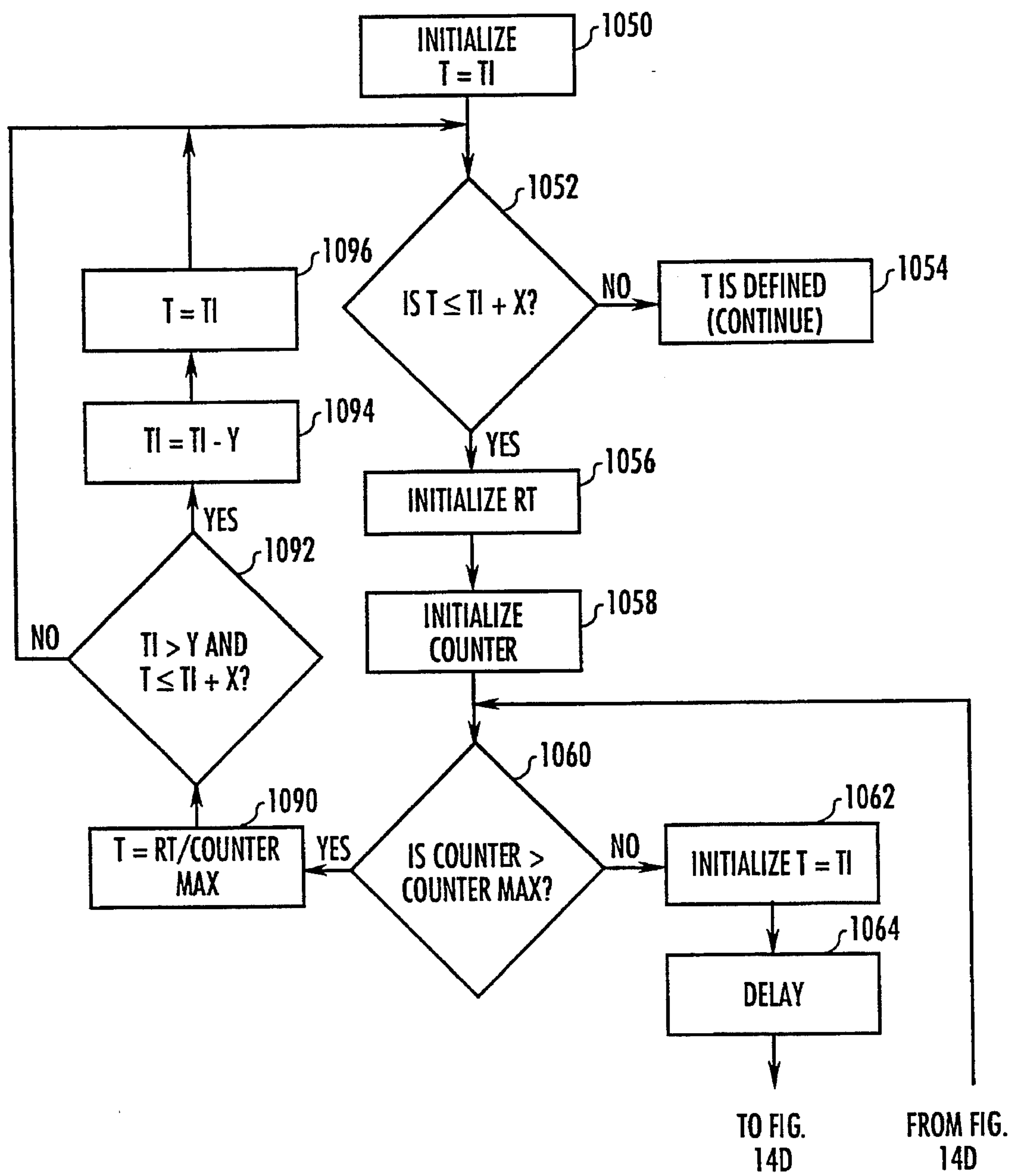
Figure 14D:
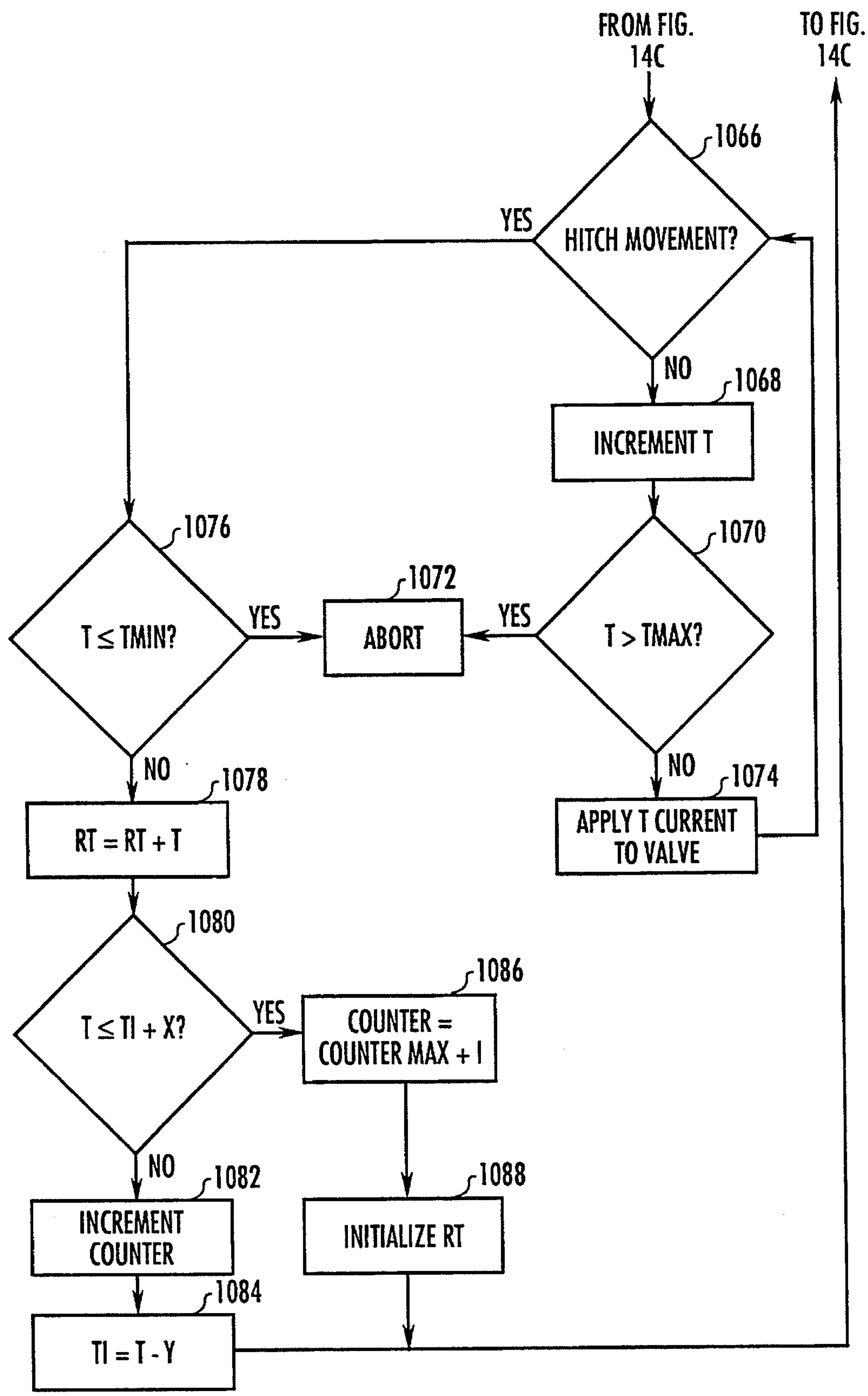

At step 1050 a current threshold value, represented by the variable T in FIG. 14C, is initialized at a predetermined initial value TI, lower than the anticipated pulse width modulated current required to cause hitch assembly 20 to move. In the present embodiment TI is initially set to a pulse width modulation value of about 15% of full pulse width. At decision block 1052 microprocessor 60 compares the current value of T to the value of TI plus a predetermined value represented by the symbol X. The value X represents the minimum pulse width modulated current difference allowable between the initial threshold value TI and the threshold ultimately determined by the calibration sequence. Because confidence in the determined threshold value is enhanced by ensuring that the iterative process by which it is reached proceeds through several cycles, by comparing the value of this threshold T to the initial value TI plus the value X at step 1052, microprocessor 60 effectively ensures that only a threshold value exceeding the initial value by more than the value X will be recognized as a valid threshold. In the initial execution of step 1052 the response to the decision block will always be "yes," the value of the threshold having been set equal to TI.

At step 1056 microprocessor 60 initializes a variable RT, representing a running total of the determined threshold values T, at zero. At step 1058 microprocessor 60 initializes a counter at zero. At step 1060 the current value of the counter is compared to a predetermined maximum counter value. Steps 1058 and 1060 effectively force microprocessor 60 iteratively to determine values for the threshold T a predetermined number of times before proceeding to compute an average of these threshold values as will be described. In the initial execution of step 1060, the counter value will be less than the counter maximum value and microprocessor 60 will continue to step 1062. At step 1062 microprocessor 60 initializes the threshold value T at the initial threshold value TI. Although in the initial execution of step 1062 these values will be equal as a result of step 1050, in subsequent threshold determining loops the threshold value T will be equal to the value determined during the previous loop. Thus, step 1062 serves to reset the threshold value T for each new iterative loop. At step 1064 microprocessor 60 waits a predetermined time, typically several seconds, before proceeding, to allow hitch assembly 20 to stabilize, avoiding false readings of hitch movement.

At step 1066 microprocessor 60 receives the signal generated by position sensor 78, converts this signal to a digital value, and compares this digital value to the previously stored position value. In the initial execution of step 1066 the latter value would be stored in RAM 56 at step 1008 for the raise threshold sequence, and at step 1022 for the lower threshold sequence. Microprocessor 60 is configured to recognize movement of hitch assembly 20 when the position value changes a predetermined amount, typically two counts in the digital range of the position value, corresponding to a fraction of a degree of angular displacement of hitch assembly 20. If no hitch movement is detected at step 1066, microprocessor 60 proceeds to step 1068 where the threshold value T is incremented a predetermined amount, typically 0.3% of the position command pulse width modulation current range. At step 1070 the current value of T is compared to a predetermined maximum allowable threshold value. This maximum allowable threshold is selected at a level (e.g. 50% of the maximum current) at which movement should occur absent some problem or impediment, such as a mechanical blockage. If T is equal to or greater than this maximum allowable value, microprocessor 60 proceeds to step 1072 and aborts the calibration procedure, returning to step 288 in FIG. 7D. If T is less than the maximum allowable value, microprocessor 60 causes a pulse width modulated current at a value T to be applied to either raise coil 38 or lower coil 39 depending upon whether the raise or lower threshold is being calibrated. With this current applied to the valve coil, microprocessor 60 repeats step 1066 to determine if hitch assembly 20 has moved. Steps 1068, 1070, 1074 and 1066 are thus repeated until hitch movement is detected or until the threshold value T exceeds the maximum allowable value.

Once hitch movement is detected microprocessor 60 proceeds to step 1076 and compares the value T at which the movement occurred to a predetermined minumum value such as 4% of the maximum current. If the determined threshold value is equal to or lower than this minimum value, calibration is aborted at step 1072 and microprocessor 60 returns to step 288 in FIG. 7D. If the value of T is greater than the minumum allowable threshold, the current value of T is added to the running total RT at step 1078.

At step 1080 the value of T is compared to the initial threshold value TI plus the value X discussed above. If T is less than or equal to TI plus X, the determined threshold is considered too close to the initial threshold and microprocessor 60 proceeds to step 1086 where the counter is set equal to the maximum counter value plus 1, then to step 1088 where the running total RT is again initialized at zero, and returns to step 1060. At this point, because the counter exceeds the maximum counter value, microprocessor 60 proceeds to step 1090, computing an average threshold value (equal to zero due to the initialization of the running total), and to step 1092 where the initial threshold value TI is compared to a value Y and the threshold value T is compared to the initial threshold value plus the value X. The value Y is a quantity by which the initial threshold value is reduced in the event the determined threshold was found too close to the initial threshold value. In the present embodiment the value Y is equal to about 3% of full pulse width modulated current. Step 1092 effectively determines whether microprocessor 60 exited the iterative threshold determining process due to the condition at step 1080. If such is the case, microprocessor 60 proceeds to step 1094 where the initial threshold value is reduced by the value Y, and to step 1096 where the threshold value T is set equal to the reduced value of TI. At this point the threshold determining process is reentered at step 1052. The effect of steps 1080, 1086 and 1088 is to remove microprocessor 60 from the iterative threshold determining process and to restart the process at a lower initial threshold level. It should be noted that, where microprocessor 60 is thus caused to restart the threshold determining process, the running total RT is initialized at zero at step 1088 and the counter value is re-initialized at step 1058. This effectively forces control system 40 to determine the threshold T a predetermined number (equal to the maximum counter value) of consecutive times.

If at step 1080 the value of T is found to be greater than the initial value TI plus the value X, microprocessor 60 proceeds to step 1082 where the counter is incremented by 1. At step 1084 the initial value TI is set equal to the determined threshold value T less the value Y. Because the initial value TI may be substantially lower than the ultimately determined threshold value T, adjusting the initial threshold value TI at step 1084 shortens the number of iterative loops through steps 1066, 1068, 1070 and 1074 required to determine T in subsequent steps, effectively shortening the time required for calibration.

With the initial threshold value adjusted at step 1084, microprocessor 60 returns to step 1060. If the counter value does not yet exceed the maximum counter value, the iterative process described above is repeated beginning at step 1062. Once the desired number of loops have been completed without interruption at step 1080, microprocessor 60 proceeds from step 1060 to step 1090 where an average of the determined threshold values is computed. At step 1092, if the threshold determining sequence has not been interrupted at step 1080 as described above, microprocessor 60 will proceed to step 1052. Where a threshold value T has been successfully determined, the comparison performed at step 1052 will cause microprocessor 60 to proceed to step 1054, where the value of T is defined as either Traise or Tlower, and from which microprocessor 60 proceeds either to step 10 16 or 1034 depending upon whether the raise or lower threshold has been determined.

Throughout the calibration process, if unallowable component failure is detected, or if the operator opts to quit the calibration sequence, control system 40 proceeds directly to step 288 (FIG. 7C), resulting in aborting calibration at step 282. In such cases none of the values determined in the calibration process are written to EEPROM 58, and the relevant values in RAM 56 are reset to their existing values from EEPROM 58. If no such failure or operator quit command is detected, the values determined during the calibration sequence and required for control of tractor 10 are stored in EEPROM 58 as indicated at step 296. In the present embodiment the calibration values stored in EEPROM 58 include Veal, Config, Traise, Tlower, Pos-actual-min, Posrange, Coilparamcal, Pos-com-min, Rpinoffset, Lpinoffset, and Poscorr.

The parameters thus calibrated and stored during the calibration process described are employed in the control of tractor 10 by control system 40 as follows. The value Config is used by control system 40 to determine the mode of operation such as at step 600 discussed above. The values of Traise and Tlower are added to the position command signal for raising and lowering hitch assembly 20 respectively. The value Pos-actual-min is subtracted from digitized values position signals received from position sensor 78. The value Posrange serves as a ceiling for the upper limit of hitch assembly 20 as set by upper limit knob 94 and potentiometer 95. The value Pos-com-min is subtracted from position command signals generated by potentiometer 70. The values Rpinoffset and Lpinoffset are subtracted from digitized draft signals generated by draft sensors 82 and 84. And the value Poscorr is multiplied by position command signals to ensure that the position of hitch assembly 20 accurately tracks the position of command lever 68.

Figure 15:
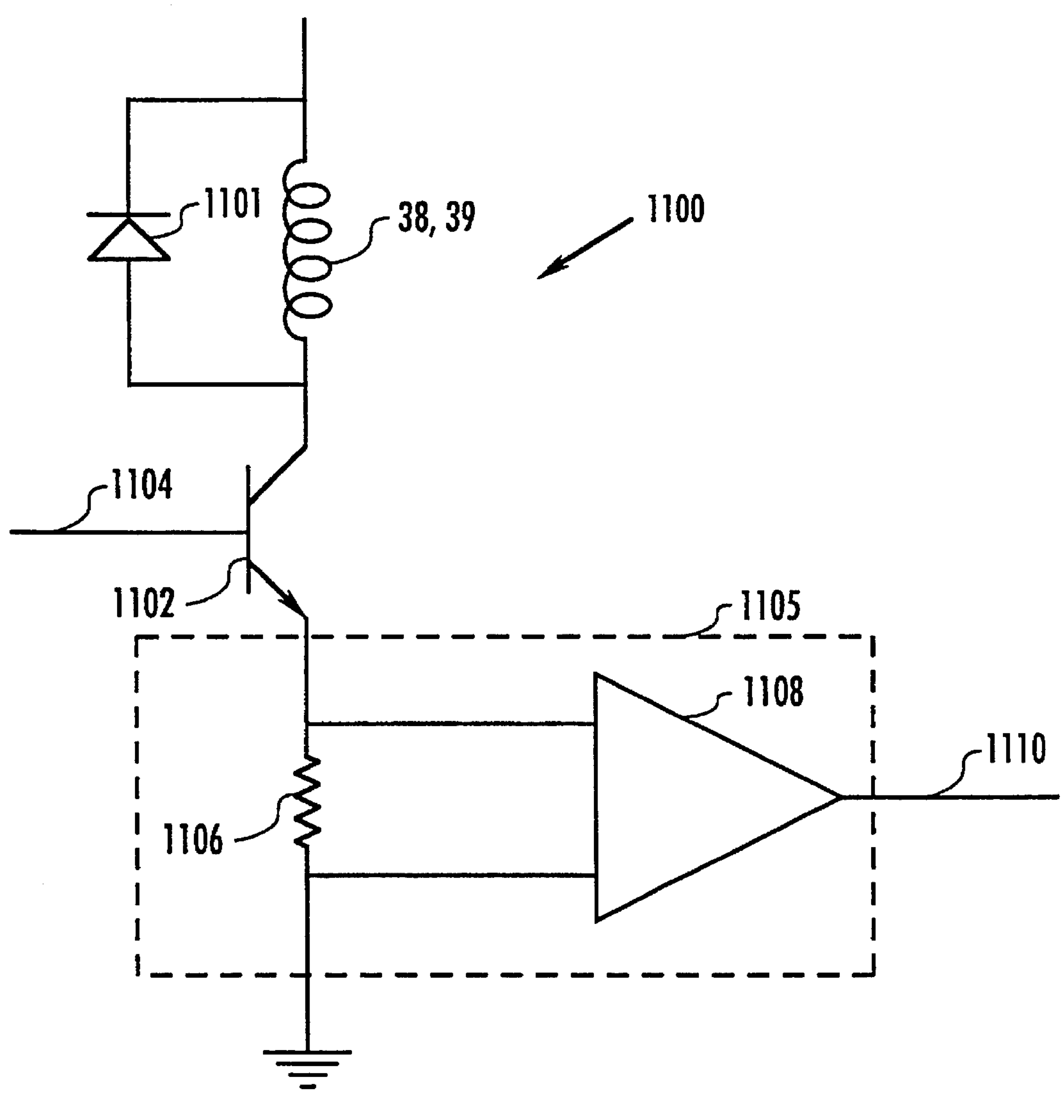
FIG. 15 is an schematic representation of a typical arrangement for determining an electrical parameter of a solenoid coil in accordance with the invention.

FIG. 15 illustrates a typical coil circuit 1100. The circuit includes a flyback diode 1101, and a transistor 1102, the gate of which is coupled to coil 38 or 39. The base 1104 of transistor 1002 is coupled either directly or indirectly to microprocessor 60, while the emitter is coupled to a sensing circuit 1105, including a resistor 1106 in parallel with an operational amplifier 1108. Resistor 1106 preferably has a very low, precise resistance, such as 0.1 ohm. Thus, when pulse width modulated current is supplied to coil 38 and an appropriate control signal is supplied to the base of transistor 1102 from microprocessor 60, sensing circuit 1105 produces an output signal, Coilparam, in conductor 1110 equal to its gain multiplied by the voltage drop across resistor 1106. Moreover, this signal is equal to the current through coil 38 multiplied by the resistance of resistor 1106 and by the gain of operational amplifier 1108. Additionally, if the resistance of resistor 1106 is sufficiently low and the voltage drop across transistor 1002 is low, the output signal from sensing circuit 1105 is approximately equal to the voltage input to coil 38 (i.e. the voltage of battery 18) divided by the resistance of coil 38. Thus, sensing circuit 1105 permits measurements of parameters, such as current through coil 38 or a signal approximately proportional to the voltage of battery 18 divided by the resistance of coil 38. Similar sensing circuits 1105 are coupled to each coil 38, 39 and the output signals from each circuit 1105 are applied to control system 40 at inputs 35 and 37.

During the calibration process discussed above, the output signal from operational amplifier 1108 is applied to microprocessor 60 at step 1018, converted to a digital signal, and stored in RAM 56 as Coilparamcal. If all parameters are successfully calibrated this value is stored in EEPROM 58. Subsequently, during normal operation of tractor 10, control system 40 is configured to sample the output of operational amplifier 1108, Coilparam, when hitch assembly 20 is raised by a full pulse width current signal. In the present embodiment, control system samples Coilparam when hitch assembly 20 is raised in response to an operator depressing switch 90 in the UP position and the distance to be traveled by hitch assembly 20 is at least ⅓ of the hitch displacement range. Once Coilparam has been sampled, control system 40 is configured to generate a coil correction factor equal to the ratio of Coilparamcal to Coilparam.

Similarly, during normal operation of tractor 10, control system 40 is configured to regularly sample the voltage of battery 18, to generate a digital value representative of this voltage, Vbat, and to store this value in RAM 56. Control system 40 is further configured to generate voltage correction factor equal to the ratio of Vcal, determined at step 1002 of the calibration process, to Vbat.

The coil and voltage correction factors are used in the control of hitch assembly 20 as follows. Because the voltage available from battery 18, and the resistance of coils 38 and 39 may fluctuate during operation of tractor 10 due to environmental conditions, such as the ambient temperature, and running conditions, such as the tractor's oil temperature, control signals from control system 40 may be inconsistent, or have inconsistent effects without compensation for such changes. By applying the coil correction factor or voltage correction factor to control signals applied by control system 40 to coils 38 and 39 this inconsistency can be avoided. In the present embodiment, all control signals to coils 38 and 39 are multiplied by the voltage correction factor until the output of sensing circuit 1105 is sampled and a coil correction factor is generated as discussed above. Thereafter signals from control system 40 to coils 38 and 39 are multiplied by the coil correction factor.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A hitch control system for a vehicle, the vehicle including a battery coupled to the control system, and at least one device responsive to control signals from the control system, the control system comprising:

a voltage sensor for generating voltage signals representative of the voltage of the battery; and a control circuit coupled to the voltage sensor wherein the control circuit is included in a digital processor, and includes an analog to digital converter for converting the voltage signals to digital values, a memory circuit for storing the digital values and a signal processing circuit for generating the correction factor and wherein the control circuit is configured to generate the correction factor based upon the voltage signals and upon a reference voltage signal and to apply the correction factor to the control signals.

2. The control system as set forth in claim 1, wherein the reference voltage signal is representative of the battery voltage upon startup of the vehicle.

3. The control system as set forth in claim 1, the correction factor is a ratio of a battery voltage upon startup of the vehicle and the battery voltage at a time subsequent thereto.

4. The hitch control system as set forth in claim 1, wherein the signal correction factor is a ratio of the voltage signal generated during a calibration sequence and the voltage signal at a time subsequent thereto.

5. The control system as set forth in claim 1, wherein the control circuit is configured to multiply the value of the control signals by the correction factor.

6. A control system for an agricultural vehicle, the vehicle including a battery coupled to the control system, a movable attachment member configured for coupling to an implement, and an actuator circuit coupled to the attachment member and configured to move the member in response to command signals from the control system, the control system comprising:

means for generating voltage signals representative of the voltage of the battery;

means for generating a signal correction factor based upon the voltage signals; and means for applying the signal correction factor to the control signals.

7. The control system as set forth in claim 6, wherein the means for generating voltage signals include a voltage transformer.

8. The control system as set forth in claim 6, wherein a means for storing voltage signals and the means for generating a signal correction factor are included in a digital signal processor.

9. A hitch control system for a tractor, the tractor including a battery coupled to the control system, a movable hitch, and an actuator circuit coupled to the control system and to the hitch and configured to move the hitch in response to control signals from the control system, the control system comprising:

a voltage monitoring device coupled to the battery for generating voltage signals representative of the voltage of the battery; and a control circuit configured to generate a signal correction factor based upon the voltage signals and to apply the correction factor to the control signals.

10. The hitch control system as set forth in claim 9, wherein the control circuit is included in a digital signal processor, and includes an analog to digital converter for converting the voltage signals to digital values, a memory circuit for storing the digital values and a signal processing circuit for generating the correction factor.

11. The hitch control system as set forth in claim 9, wherein the signal correction factor is a ratio of the voltage signal generated at startup of the tractor and the voltage signal at a time subsequent thereto.

12. The hitch control system as set forth in claim 9, wherein the signal correction factor is a ratio of the voltage signal generated during a calibration sequence and the voltage signal at a time subsequent thereto.

13. The hitch control system as set forth in claim 9, wherein the control circuit is configured to multiply the control signals by the correction factor.

14. A control system for a vehicle, the vehicle including a battery coupled to the control system, a movable attachment member, and a solenoid operated actuator circuit including at least one solenoid coil configured to move the attachment member in response to control signals from the control system, the control system comprising:

a measuring circuit configured to generate parameter signals representative of an electrical parameter of the coil; and a control circuit coupled to the measuring circuit and configured to generate a signal correction factor based upon the parameter signals and to apply the signal correction factor to the control signals.

15. The control system as set forth in claim 14, wherein the measuring circuit generates signals representative of the voltage of the battery and a resistance of the coil.

16. The control system as set forth in claim 14, wherein the measuring circuit generates signals representative of a current through the coil when the coil is energized in response to the control signals.

17. The control system as set forth in claim 14, wherein the correction factor is a ratio of a first parameter signal generated at the time of startup of the vehicle and a second parameter signal at a time subsequent thereto.

18. The control system as set forth in claim 14, wherein the correction factor is a ratio of a first parameter signal generated during a calibration sequence and a second parameter signal generated subsequent thereto.

19. The control system as set forth in claim 14, wherein the control circuit is included in a digital signal processor, and includes an analog to digital converter for converting the parameter signals to digital values, a memory circuit for storing the digital values and a signal processing circuit for generating the correction factor.

20. The control system as set forth in claim 14, wherein the measuring circuit includes a resistor capable of being placed in series with the coil, and a comparator device arranged in parallel with the resistor for measuring a voltage drop across the resistor.

21. A control system for an agricultural vehicle, the vehicle including a source of electrical energy coupled to the control system, a movable attachment member, and a solenoid operated actuator circuit including at least one solenoid coil configured to move the attachment member in response to control signals from the control system, the control system comprising:

means for generating parameter signals representative of an electrical parameter of the coil;

means for generating a correction factor based upon the parameter signals; and means for applying the correction factor to the control signals.

22. The control system as set forth in claim 21, wherein the electrical parameter is a electrical resistance of the coil.

23. The control system as set forth in claim 21, further comprising means for converting the parameter signals to digital values and means for storing the digital values, and wherein the correction factor is generated from the digital values.

24. A hitch control system for a tractor, the tractor including a battery coupled to the control system, a movable hitch, and an solenoid operated actuator circuit having at least one solenoid coil and coupled to the hitch and configured to move the hitch in response to control signals from the control system, the control system comprising:

a measuring circuit configured to generate parameter signals representative of an electrical parameter of the coil;

a control circuit coupled to the measuring circuit and configured to generate a signal correction factor based upon the parameter signals and to apply the signal correction factor to the control signals.

25. The control system as set forth in claim 24, wherein the measuring circuit generates signals representative of a voltage of the battery and the resistance of the coil.

26. The control system as set forth in claim 24, wherein the measuring circuit generates signals representative of a current through the coil when the coil is energized in response to the control signals.

27. The control system as set forth in claim 24, wherein the correction factor is a ratio of a first parameter signal generated at the time of startup of the vehicle and a second parameter signal at a time subsequent thereto.

28. The control system as set forth in claim 24, wherein the correction factor is a ratio of a first parameter signal generated during a calibration sequence and a second parameter signal generated subsequent thereto.

29. The control system as set forth in claim 24, wherein the control circuit is included in a digital signal processor, and includes an analog to digital converter for converting the parameter signals to digital values, a memory circuit for storing the digital values and a signal processing circuit for generating the correction factor.

30. The control system as set forth in claim 24, wherein the measuring circuit includes a resistor capable of being placed in series with the coil, and a comparator device arranged in parallel with the resistor for measuring a voltage drop across the resistor.

31. A calibration method for an agricultural vehicle, the vehicle including an attachment member suitably configured for coupling to an agricultural implement; an actuator circuit coupled to the attachment member for moving the attachment member between a lower position and a raised position in response to command signals, a sensing device configured to produce a position signal representative of the position of the attachment member, a control circuit configured to receive the position signal and to produce the command signals, and a memory circuit, the method comprising the steps of:

determining a first threshold value by applying a command signal to the actuator circuit, incrementally increasing the magnitude of the command signal, monitoring the position signal from the sensing device, and storing the first threshold value in the memory circuit when the sensing device detects a change in position of the attachment member;

repeating said steps to determine at least a second threshold value;

averaging the values to determine a threshold command value;

storing the threshold command value in the memory circuit.

32. The calibration method as set forth in claim 31, wherein the threshold command value is a signal representative of a minimum current required to raise the implement.

33. The calibration method as set forth in claim 31, wherein the threshold values are determined by moving the implement from the lower position.

34. The calibration method as set forth in claim 31, wherein the threshold command value is a signal representative of a minimum current required to lower the implement.

35. The calibration method as set forth in claim 31, wherein the threshold values are determined by moving the implement from the raised position.

36. The calibration method as set forth in claim 31, wherein three threshold values are determined and averaged.

37. The calibration method as set forth in claim 31, including the further step of comparing the threshold values to predetermined minimum and maximum values, and wherein the threshold command value is determined only from those threshold values falling between the minimum and maximum values.

38. A control method for an agricultural vehicle, the vehicle having a battery, a control circuit coupled to the battery and at least one device movable in response to control signals from the control circuit, the method comprising the steps of:

generating voltage signals representative of a voltage of the battery;

generating a correction factor from the voltage signals; and applying the correction factor to the control signals.

39. The control method as set forth in claim 38, wherein the correction factor is generated from a first voltage signal representative of the voltage of the battery generated at startup of the vehicle and a second voltage signal representative of the voltage of the battery at a time subsequent thereto.

40. A control method for an agricultural vehicle, the vehicle having a battery, a control circuit coupled to the battery, a movable device and a solenoid operated actuator circuit having at least one solenoid coil, the actuator circuit being coupled to the movable device and configured to move the device in response to control signals from the control circuit, the method comprising the steps of:

generating parameter signals representative of an electrical parameter of the coil;

generating a correction factor from the parameter signals; and applying the correction factor to the control signals.

41. The control method as set forth in claim 40, wherein the parameter signals are electrical signals representative of a voltage of the battery and a resistance of the coil.

42. The control method as set forth in claim 40, wherein the parameter signals are electrical signals representative of the current through the coil when the coil is energized in response to the control signals.

43. The control method as set forth in claim 40, wherein the correction factor is a ratio of a first parameter signal generated at the time of startup of the vehicle and a second parameter signal at a time subsequent thereto.

44. The control method as set forth in claim 40, wherein the correction factor is a ratio of a first parameter signal generated during a calibration sequence and a second parameter signal at a time subsequent thereto.

* * * * *